US012351069B1

(12) United States Patent
Lobo et al.

(10) Patent No.: US 12,351,069 B1
(45) Date of Patent: Jul. 8, 2025

(54) LOW VOLTAGE BATTERY-LESS ARCHITECTURE FOR ELECTRIC VEHICLES

(71) Applicant: Rivian IP Holdings, LLC, Irvine, CA (US)

(72) Inventors: Kyle Lobo, Westchester, CA (US); Sanjeewa Keven Sugatapala, Long Beach, CA (US); Muhammad Mobeen Mahmood, Irving, TX (US); Joseph Daniel Himmelheber, Redondo Beach, CA (US); Baojin Wang, San Marcos, CA (US); Brandon Louis Fennema, Rancho Santa Margarita, CA (US); Todd Adams Putnam, Mammoth Lakes, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/599,107

(22) Filed: Mar. 7, 2024

Related U.S. Application Data

(60) Provisional application No. 63/556,356, filed on Feb. 21, 2024.

(51) Int. Cl.
*B60L 58/21* (2019.01)
*B60L 53/16* (2019.01)
*B60L 53/22* (2019.01)

(52) U.S. Cl.
CPC ............... *B60L 58/21* (2019.02); *B60L 53/16* (2019.02); *B60L 53/22* (2019.02); *B60L 2210/10* (2013.01)

(58) Field of Classification Search
None
See application file for complete search history.

(56) References Cited

U.S. PATENT DOCUMENTS

| | | | |
|---|---|---|---|
| 6,700,795 B1 | 3/2004 | Jones et al. | |
| 6,930,404 B1 | 8/2005 | Gale et al. | |
| 8,618,771 B2 | 12/2013 | Ichikawa | |
| 9,496,730 B2 | 11/2016 | Gallegos et al. | |
| 2020/0274375 A1 | 8/2020 | Griffiths | |
| 2022/0131398 A1 | 4/2022 | Herranz | |
| 2022/0332206 A1* | 10/2022 | Murthy-Bellur | B60L 53/50 |
| 2023/0031460 A1 | 2/2023 | Taniguchi | |
| 2023/0120402 A1* | 4/2023 | Juang | H02J 7/342 |
| | | | 307/19 |
| 2023/0271512 A1* | 8/2023 | Ashraf | B60L 50/66 |
| | | | 307/10.7 |
| 2023/0365012 A1* | 11/2023 | Namuduri | H02M 3/33584 |

\* cited by examiner

*Primary Examiner* — Jared Fureman
*Assistant Examiner* — Aqeel H Bukhari
(74) *Attorney, Agent, or Firm* — BAKERHOSTETLER

(57) ABSTRACT

Aspects of the subject disclosure relate to a modular electronic component assembly for a battery pack. The battery pack may be implemented in a vehicle. The modular electronic component assembly may include an electrical architecture housed within a modular enclosure that is configured to be attached to a frame or housing of an energy volume of the battery pack. The electrical architecture may include components and/or circuitry configured to provide a high voltage from the energy volume to one or more high voltage connectors on the modular enclosure, and components and/or circuitry configured to provide a low voltage (lower than the high voltage) to one or more low-voltage connectors on the modular enclosure, without the use or presence of a separate low-voltage battery.

19 Claims, 19 Drawing Sheets

1500 ⇘

```
┌─ 1502
│ Provide a first voltage from a battery of a vehicle to a
│ propulsion component of the vehicle
└────────────────┬────────────────
                 ▼           ┌─ 1504
┌──────────────────────────────────────
│ Provide, while providing the first voltage from the battery
│ to the propulsion component, a second voltage, lower
│ than the first voltage, from the battery to an electronic
│ component of the vehicle
└──────────────────────────────────────
```

FIG. 15

LOW VOLTAGE BATTERY-LESS ARCHITECTURE FOR ELECTRIC VEHICLES

CROSS REFERENCE TO RELATED APPLICATIONS

This application claims the benefit of priority to U.S. Provisional Patent Application No. 63/556,356, entitled, "Low Voltage Battery-Less Architecture for Electric Vehicles", filed on Feb. 21, 2024, the disclosure of which is hereby incorporated herein in its entirety.

INTRODUCTION

Batteries are often used as a source of power, including as a source of power for electric vehicles that include wheels that are driven by an electric motor that receives power from the battery.

Aspects of the subject technology can help to improve the efficiency, serviceability, reliability, and/or range of electric vehicles, which can help to mitigate climate change by reducing greenhouse gas emissions.

SUMMARY

Aspects of the subject technology relate to a power supply architecture that provides both high voltage (e.g., hundreds of volts) and low voltage (e.g., 12 volts) power from a common high voltage energy volume, without the use, or presence, of a low-voltage battery separate from the high voltage energy volume. The power supply architecture may be implemented in a modular, serviceable, grounded enclosure that is configured to mechanically and electrically couple to any of various battery pack frames for various energy volumes. An enclosure for the power supply architecture may be formed from insulating materials and may include one or more conductive layers for electromagnetic interference (EMI) mitigation and/or electromagnetic compatibility (EMC). In this way, power electronics for a battery pack may be housed in a separate modular enclosure, that is attachable to an energy volume (e.g., at a rear of a pack frame housing the energy volume) to provide both low and high voltage outputs from a high voltage energy volume.

In accordance with aspects of the disclosure, battery pack for a vehicle is provided, the battery pack including: one or more batteries configured to provide a first voltage; first circuitry configured to provide access to the first voltage from the one or more batteries by a drive component of the vehicle; and second circuitry configured to receive the first voltage from the one or more batteries and to provide access to a second voltage, lower than the first voltage, by one or more electrical components of the vehicle. The first circuitry may include a high voltage connector and a contactor disposed between the one or more batteries and the high voltage connector, and the second circuitry may be configured to provide redundant access to the second voltage by the one or more electrical components of the vehicle. The second circuitry may include first and second direct-current-to-direct-current (DCDC) converters and first and second low voltage buses electrically coupled to first and second DCDC converters, respectively.

The one or more batteries may include a first battery subassembly and a second battery subassembly, the first DCDC converter may be configured to receive the first voltage from the first battery subassembly and to be electrically isolated from the second battery subassembly, and the second DCDC converter may be configured to receive the first voltage from the second battery subassembly and to be electrically isolated from the first battery subassembly. The one or more batteries may also include at least a third battery subassembly, the first DCDC converter may be configured to receive the first voltage from the first battery subassembly and at least the third battery subassembly, and the second DCDC converter may be electrically isolated from the first battery subassembly and the third battery subassembly.

The battery pack may also include a switching mechanism configured to switchably connect the first low voltage bus between the first and second DCDC converters and to switchably connect the second low voltage bus between the first and second DCDC converters, for load balancing of at least the first battery subassembly and the second battery subassembly. The second circuitry may also include control circuitry for operating one or more of the electrical components that are located in a zone of the vehicle. The zone may include a rear zone of the vehicle, and the second circuitry may be further configured to provide the second voltage to one or more zone controllers, external to the battery pack, for operating one or more additional electrical components located in one or more other zones of the vehicle.

The control circuitry may include: first control circuitry coupled with the first DCDC converter and configured to operate a first subset of the one or more electrical components; and second control circuitry coupled with the second DCDC converter and configured to operate a second subset of the one or more electrical components. The one or more batteries may be disposed within a frame of an energy volume of a battery pack, and the first circuitry and the second circuitry may be disposed within a modular enclosure attached to the frame of the energy volume. The second circuitry may include at least one low voltage port that is accessible from a top of the modular enclosure and configured for direct connection to an electrical harness of the vehicle. The battery pack may be implemented in the vehicle, and the vehicle may be free of a low voltage battery separate from the one or more batteries of the battery pack.

In accordance with other aspects of the disclosure, a modular electronic component assembly is provided that includes an enclosure configured to mechanically couple to a frame of any of a plurality of energy volumes having a plurality of different types; first circuitry within the enclosure and configured to provide a first voltage from any of the plurality of energy volumes having the plurality of different types to one or more first connectors of the modular electronic component assembly; and second circuitry within the enclosure and configured to receive the first voltage from any of the plurality of energy volumes having the plurality of different types and to provide access to a second voltage, lower than the first voltage, via one or more second connectors of the modular electronic component assembly. The first circuitry may include at least one contactor configured to disconnect the first voltage from the one or more first connectors. The one or more second connectors may be accessible via an opening in an access panel of the enclosure. The one or more first connectors may be provided on a bottom panel of the enclosure and may be configured to be sealingly separated from the one or more second connectors by a seal between the enclosure and body structure of a vehicle. The modular electronic component assembly may also include, within the enclosure, one or more of an energy management module (EMM), a battery management system (BMS), and a high voltage distribution bus (HVDB). The second circuitry may be configured to electrically couple to at least first and second sources of the first voltage in any of the plurality of energy volumes and configured to provide redundant access to the second voltage via the one or more second connectors of the modular electronic component assembly, and the modular electronic component assembly may also include: a first pyrofuse configured to disconnect the second circuitry from the first source of the first voltage without disconnecting the second circuitry from the second source of the first voltage; and a second pyrofuse configured to disconnect the second circuitry from the second source of the first voltage without disconnecting the second circuitry from the first source of the first voltage.

In accordance with other aspects of the disclosure, a method is provided that includes providing a first voltage from a battery of a vehicle to a propulsion component of the vehicle; and providing, while providing the first voltage from the battery to the propulsion component, a second voltage, lower than the first voltage, from the battery to an electronic component of the vehicle. The method may also include disconnecting the battery from the propulsion component; and continuing to provide, while the propulsion component of the vehicle is disconnected from the battery, the second voltage from the battery to the electronic component.

BRIEF DESCRIPTION OF THE DRAWINGS

Certain features of the subject technology are set forth in the appended claims. However, for purpose of explanation, several embodiments of the subject technology are set forth in the following figures.

FIG. 15 illustrates a flow chart of illustrative operations that may be performed for operating an electric vehicle in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology described herein relate to a low voltage battery-less architecture for electric vehicles. A low voltage battery-less architecture may receive a high voltage input from an energy volume of a battery pack, and output both the high voltage to one or more high voltage connectors, and a low voltage to one or more low voltage connectors. In one or more implementations, the low-voltage power may be provided using one or more direct-current-to-direct current converters (DCDCs). For example, the low voltage battery-less architecture may include multiple DCDCs coupled to different sets of battery cells (e.g., different battery subassemblies, groups, or modules) in the energy volume to provide redundant sources of low-voltage power. The low-voltage power may be accessed via multiple low-voltage buses that are coupled to the multiple DCDCs. The low-voltage busses may be directly accessible via openings in an access panel in an enclosure for the low voltage battery-less architecture. In one or more implementations, the enclosure may be attached to a pack frame of an energy volume, and positioned under a rear seat of a vehicle. Each DCDC may be coupled to a corresponding set of battery modules pre-contactor, and thus receive unswitched power from that set of battery modules. In this way, low-voltage power can continue to be provided in the event that one or more contactors disconnect the high voltage (e.g., following an impact, or in preparation for service).

Power electronics for providing the high voltage and low voltage power may be housed in a modular electronic component enclosure, which may be mechanically and electrically couplable to the energy volume of any of various battery packs having various sizes and/or having battery cells of various cell chemistries.

Figure 1A:
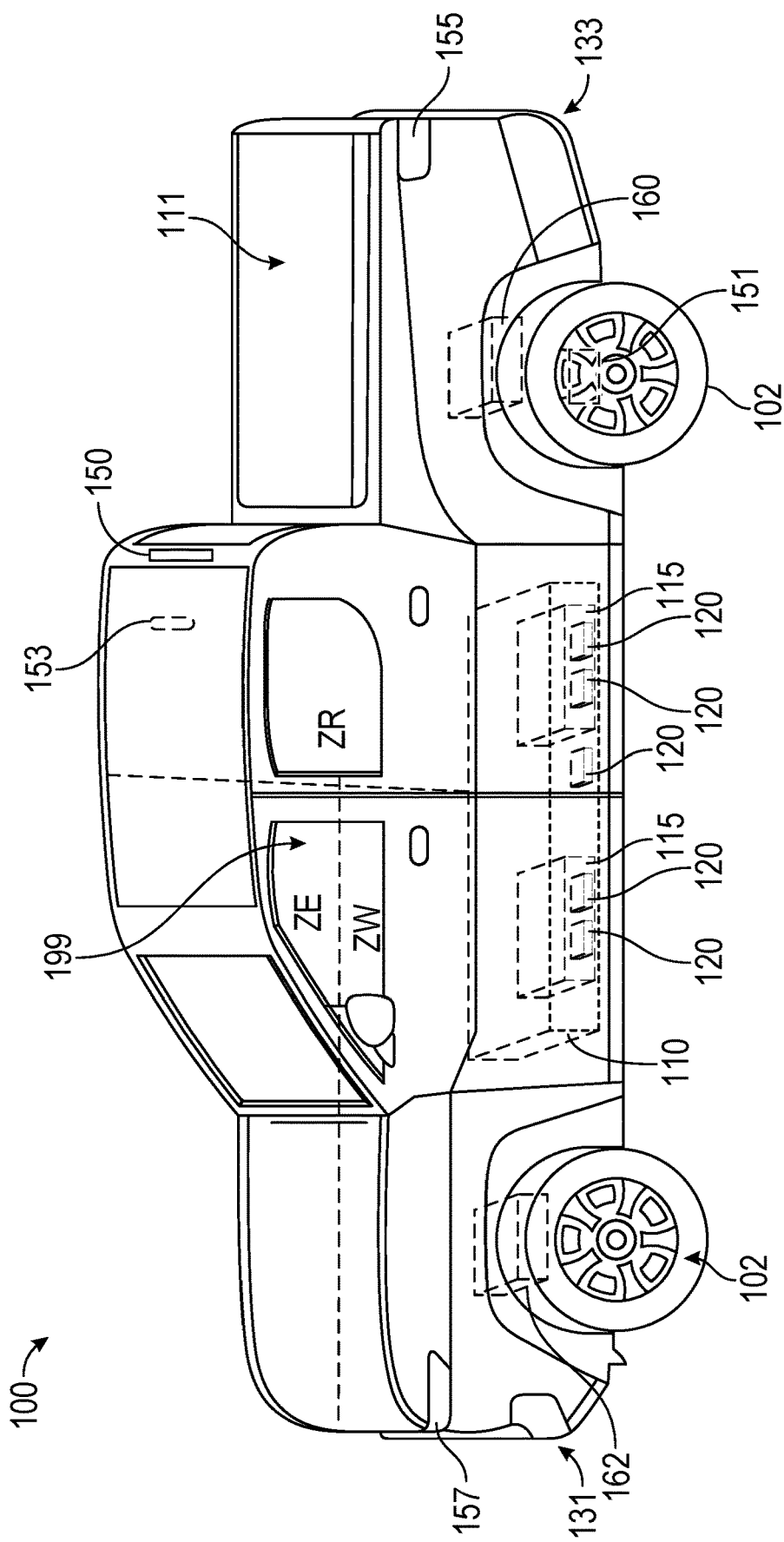
FIGS. 1A and 1B illustrate schematic perspective side views of example implementations of a vehicle having a battery pack in accordance with one or more implementations.

FIG. 1A is a diagram illustrating an example implementation of a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more drive components, such as electric motors, that drive the wheels 102 of the vehicle using electric power from the battery pack 110. In the example of FIG. 1A, the vehicle 100 includes a drive component 160 (e.g., a drive unit, such as an electric motor) for powering the rear wheels 102 of the vehicle, and a drive component 162 (e.g., another drive unit, such as another electric motor) for powering the front wheels 102 of the vehicle. In various other implementations, the vehicle 100 may include fewer than two drive components (e.g., a single electric motor for the front wheels or a single electric motor for the rear wheels) or more than two drive components (e.g., individual electric motors for three or four of the wheels 102). In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid).

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

For example, the battery cell 120 can be included a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100. The vehicle 100 may have a front end 131 and a rear end 133.

In one or more implementations, the drive components 160 and 162 may be powered by a high voltage output (e.g., hundreds of volts) from the battery pack 110. In one or more implementations, the vehicle 100 may include various electronic components that are powered by a low voltage output (e.g., a twelve volt output or an output of between twelve and fifteen volts, or between forty and sixty volts) from the battery pack 110 (e.g., without the use, or presence, of a separate low voltage battery that directly generates the low voltage). Examples of electronic components that may be powered by a low voltage output from the battery pack 110 include a headlamp 157, a turn indicator 155, an interior light 153, and/or a center high-mounted stop lamp (CHMSL) 150. Other examples of electronic components that may be powered by a low voltage output from the battery pack 110 include a wiper, an audio amplifier, a fog lamp, a radar component, a mirror actuator, an HVAC component, a seat heater, a seat ventilator, a charging port, a brake lamp, a trailer connector, a door actuator, a window actuator, a ride height actuator, a defroster, a seat actuator, one or more sensors, an oil pump, and/or any other powered component of a vehicle (e.g., including, but not limited to, any powered component of a vehicle that is conventionally powered by a separate twelve volt battery, such as a lead-acid battery). As illustrated in FIG. 1A, a passenger cabin 199 of the vehicle 100 may include various zones therewithin, such as a "west" zone, ZW, an "east" zone, ZE, and a "rear" zone, ZR. For example, the west zone, ZW, may include a driver seat, the east zone, ZE, may include a front passenger seat, and the rear zone, ZR, may include one or more rows or seats behind the driver and front passenger seats. In one or more implementations, the vehicle 100 may include additional or other zones (e.g., the rear zone, ZR, may be split into left and right rear zone, and/or a third row zone).

Figure 1B:
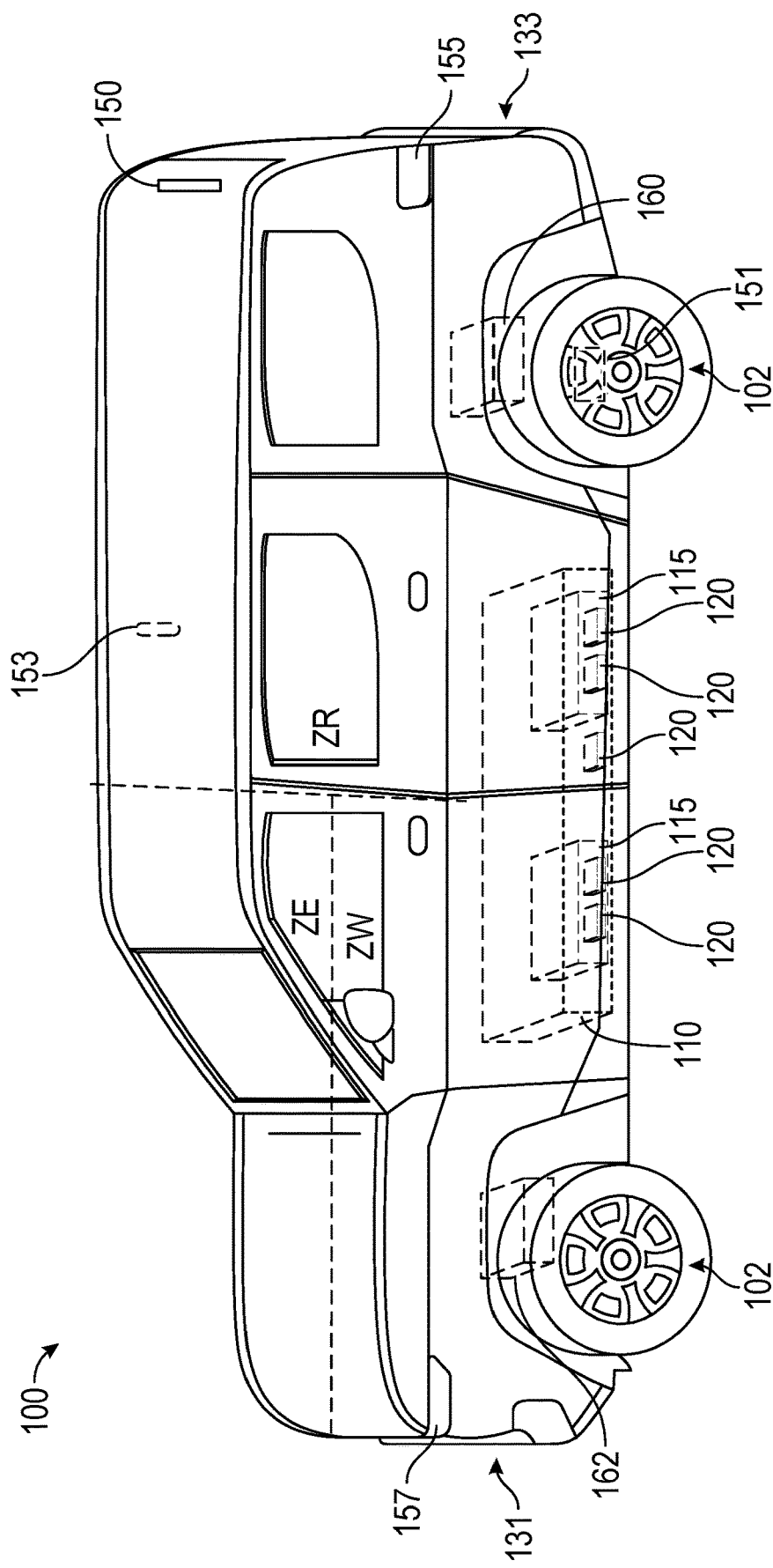

The example of FIG. 1A in which the vehicle 100 is implemented as a pickup truck having a truck bed 111 at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
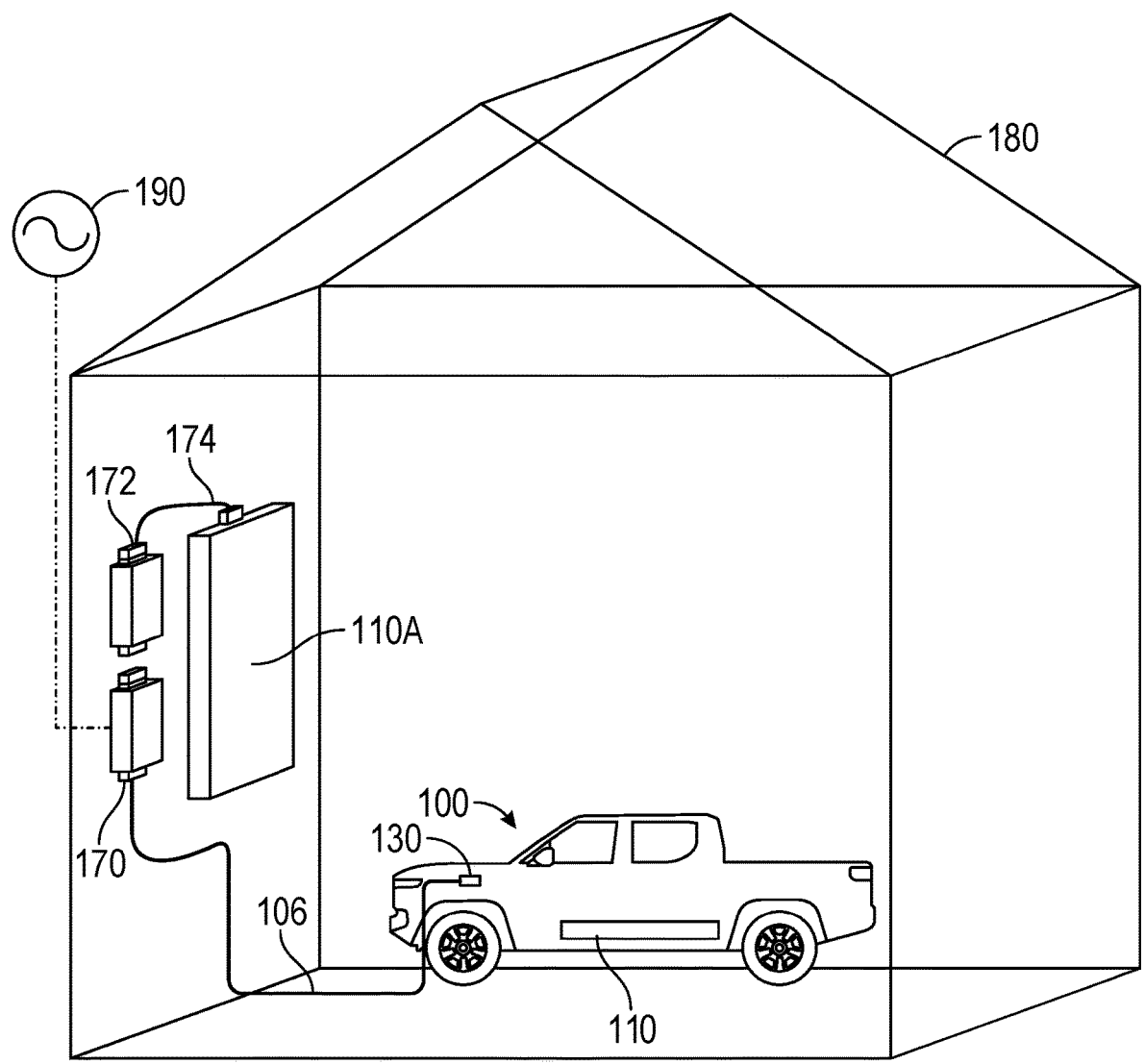
FIG. 1C illustrates a schematic perspective view of a building having a battery pack in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert high and/or low voltage DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
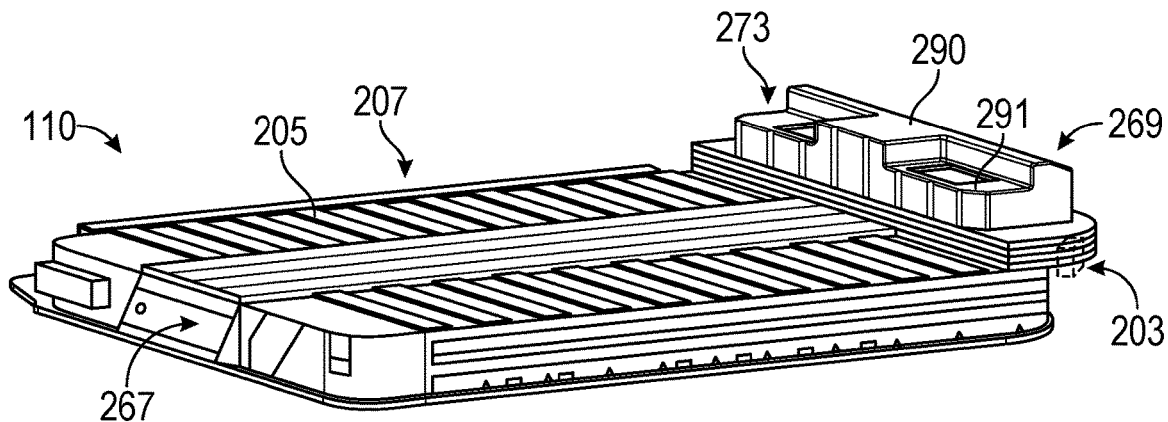
FIG. 2A illustrates a schematic perspective view of a battery pack in accordance with one or more implementations.

FIG. 2A depicts an example battery pack 110, in accordance with one or more implementations. As shown, the battery pack 110 may include a battery pack frame 205 (e.g., a battery pack housing or pack frame). For example, the battery pack frame 205 may house or enclose an energy volume 207 for the battery pack 110, the energy volume 207 including one or more battery modules 115 and/or one or more battery cells 120, and/or other battery pack components. In one or more implementations, the battery pack frame 205 may include or form a shielding structure on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

Battery pack 110 may include, within the energy volume 207 and the battery pack frame 205, multiple battery cells 120 (e.g., directly installed within the battery pack 110, or within batteries, battery units, and/or battery modules 115 as described herein) and/or battery modules 115. The battery pack 110 may also include one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within the battery pack frame 205 to generate a desired output voltage for the battery pack 110.

As shown, the battery pack 110 may also include a modular enclosure 290 (e.g., a modular electronic component enclosure or a modular electrical component enclosure, also referred to here as an enclosure) mounted to the battery pack frame 205. In one or more implementations, the modular enclosure 290 may include one or more of the conductive coupling elements for routing power from the battery cells 120 and/or battery modules 115 within the pack frame 205 (e.g., within the energy volume 207) to one or more external connection ports, such as electrical contact 203 (e.g., a high voltage terminal, port, or connector). For example, an electrical cable or harness may be connected between the electrical contact 203 and an electrical system of the vehicle 100 or the building 180, to provide electrical power (e.g., high voltage power of more than twelve volts, more than fifteen volts, more than twenty volts, more than fifty volts, more than one hundred volts, or more than several hundred volts) to the vehicle 100 or the building 180. The battery pack frame 205 may have a front end 267 and a rear end 269. In one or more implementations, when the battery pack 110 is installed in the vehicle 100, the battery pack 110 may be arranged with the front end 267 closer to the front end 131 of the vehicle and the rear end 269 closer to the rear end 133 of the vehicle. As shown, the modular enclosure 290 may be mounted to the pack frame 205 at or near the rear end 269, in one or more implementations.

In one or more implementations, the battery pack 110 may include one or more additional features, such as thermal control structures (e.g., cooling lines and/or plates and/or heating lines and/or plates). For example, thermal control structures may couple thermal control structures and/or fluids to the battery modules 115, battery units, batteries, and/or battery cells 120 within the battery pack frame 205, such as by distributing fluid through the battery pack 110.

For example, the thermal control structures may form a part of a thermal/temperature control or heat exchange system that includes one or more thermal components such as plates or bladders that are disposed in thermal contact with one or more battery modules 115 and/or battery cells 120 disposed within the battery pack frame 205, and/or one or more thermal components such as plates or bladders that are disposed in thermal contact with one or more electrical components within the modular enclosure 290. For example, a thermal component may be positioned in contact with one or more battery modules 115, battery units, batteries, and/or battery cells 120 within the battery pack frame 205. In one or more implementations, the battery pack 110 may include one or multiple thermal control structures and/or other thermal components for each of several battery module. As shown, the battery pack 110 may include an electrical contact 203 (e.g., a high voltage connector or port) by which a high voltage external load (e.g., one or more drive units of the vehicle 100 or an electrical system of the building 180) may be electrically coupled to the battery modules and/or battery cells in the battery pack 110. FIG. 2A also shows how the modular enclosure 290 may include one or more low-voltage connectors 291. As shown, a low-voltage connector 291 may be provided on a top side of the modular enclosure 290, which may be accessible from within a passenger compartment of a vehicle in some implementations (as discussed in further detail hereinafter). In various implementations, low-voltage connector(s) 291 may include one or more low voltage high power connectors, and/or one or more board mounts (e.g., fifty-three way board mounts and/or sixty-four way board mounts).

In the example of FIG. 2A (and as described in further detail hereinafter), a modular electronic component assembly 273 of the battery pack 110 may include the enclosure 290 (e.g., configured to mechanically couple to the pack frame 205 of any of various energy volumes 207 having various different types, such as different sizes, cell chemistries, etc.), first circuitry within the enclosure and configured to provide a first voltage (e.g., a high voltage) from any of the various energy volumes having the various different types to one or more first connectors (e.g., electrical contact 203) of the modular electronic component assembly, and second circuitry within the enclosure and configured to receive the first voltage from any of the various energy volumes 207 having the various different types and to provide access to a second voltage, lower than the first voltage, via one or more second connectors (e.g., low-voltage connector 291) of the modular electronic component assembly.

Figure 2B:
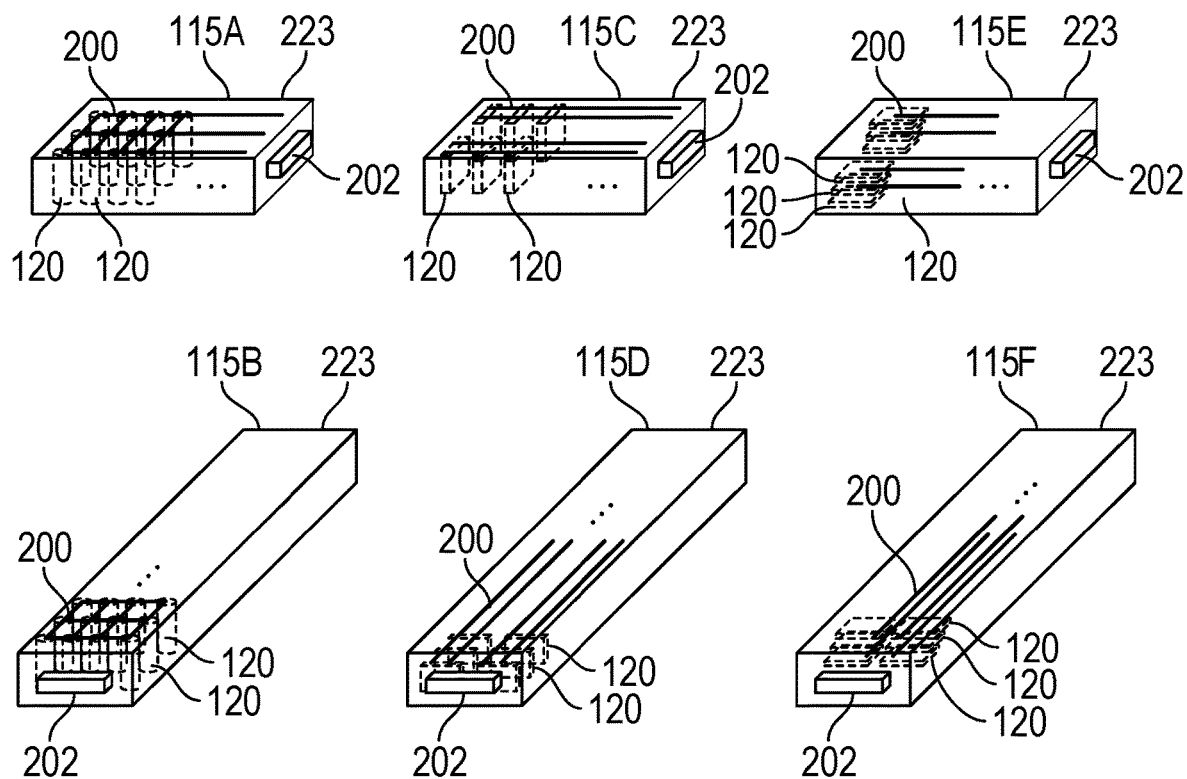
FIG. 2B illustrates schematic perspective views of various battery modules that may be included in a battery pack in accordance with one or more implementations.

FIG. 2B depicts various examples of battery modules 115 that may be disposed in the battery pack 110 (e.g., within the battery pack frame 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the battery pack frame 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the battery pack frame 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the battery pack frame 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation). In one or more implementations, the battery pack 110 may include three of the battery modules 115A (e.g., with the elongate dimension of each of the battery modules 115A extending along a direction from the front end 267 to the rear end 269 of the battery pack 110) that are separated from each other by longitudinal members that extend, between pairs of the three battery modules 115A from the front end 267 to the rear end 269 of the battery pack 110.

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the battery pack frame 205) may include or define a plurality of structures for positioning of the battery cells 120 directly within the battery pack frame 205.

Figure 2C:
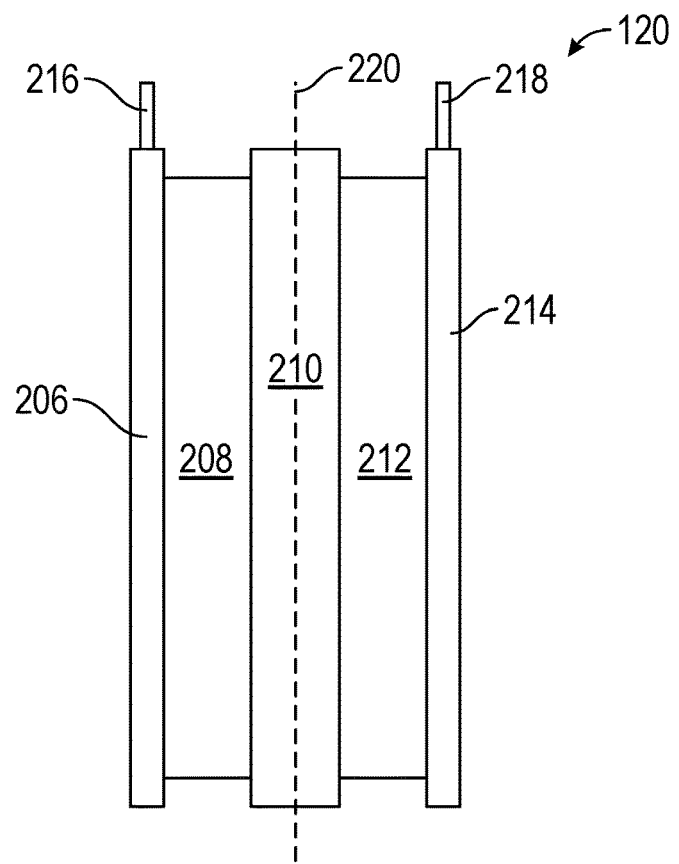
FIG. 2C illustrates a cross-sectional end view of a battery cell in accordance with one or more implementations.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cells 120 are implemented as lithium-ion battery cells, some or all of the battery cells 120 in a battery module 115, battery pack 110, or other battery or battery unit may be implemented using other battery cell technologies, such as nickel-metal hydride battery cells, sodium ion battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials.

Figure 2D:
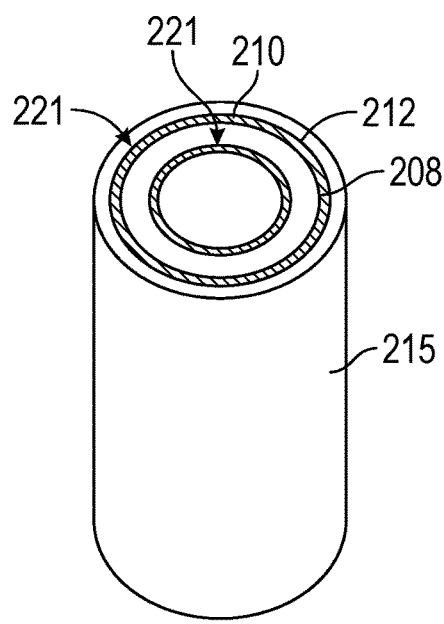
FIG. 2D illustrates a cross-sectional perspective view of a cylindrical battery cell in accordance with one or more implementations.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 215 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220) may be disposed within the cell housing 215. For example, a separator layer may be disposed between adjacent ones of the windings 221. However, the cylindrical cell implementation of FIG. 2D is merely illustrative, and other implementations of the battery cells 120 are contemplated.

Figure 2E:
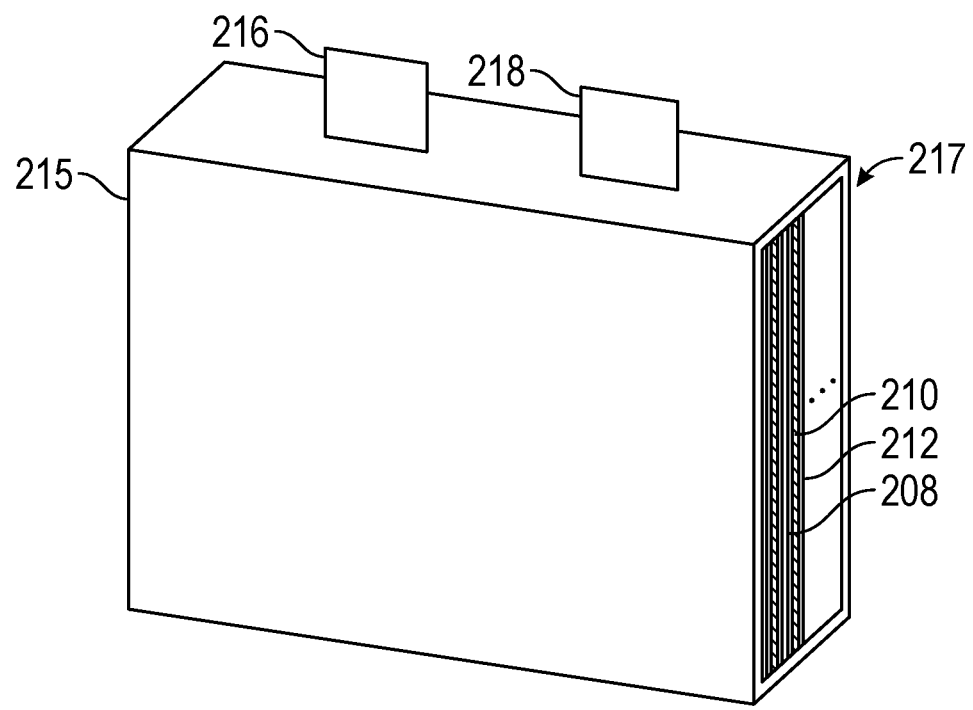
FIG. 2E illustrates a cross-sectional perspective view of a prismatic battery cell in accordance with one or more implementations.

For example, FIG. 2E illustrates an example in which the battery cell 120 is implemented as a prismatic cell. As shown in FIG. 2E, the battery cell 120 may have a cell housing 215 having a right prismatic outer shape. As shown, one or more layers of the anode 208, the cathode 212, and the electrolyte 210 disposed therebetween may be disposed (e.g., with separator materials between the layers) within the cell housing 215 having the right prismatic shape. As examples, multiple layer of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 215 having the right prismatic shape. In the implementation of FIG. 2E, the cell housing 215 has a relatively thick cross-sectional width 217 and is formed from a rigid material. For example, the cell housing 215 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 215 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 215 (e.g., a glass to metal feedthrough) as the conductor passes through to cell housing 215 to expose the first terminal 216 and the second terminal 218 outside the cell housing 215 (e.g., for contact with an interconnect structure 200 of FIG. 2B). However, this implementation of FIG. 2E is also illustrative and yet other implementations of the battery cell 120 are contemplated.

Figure 2F:
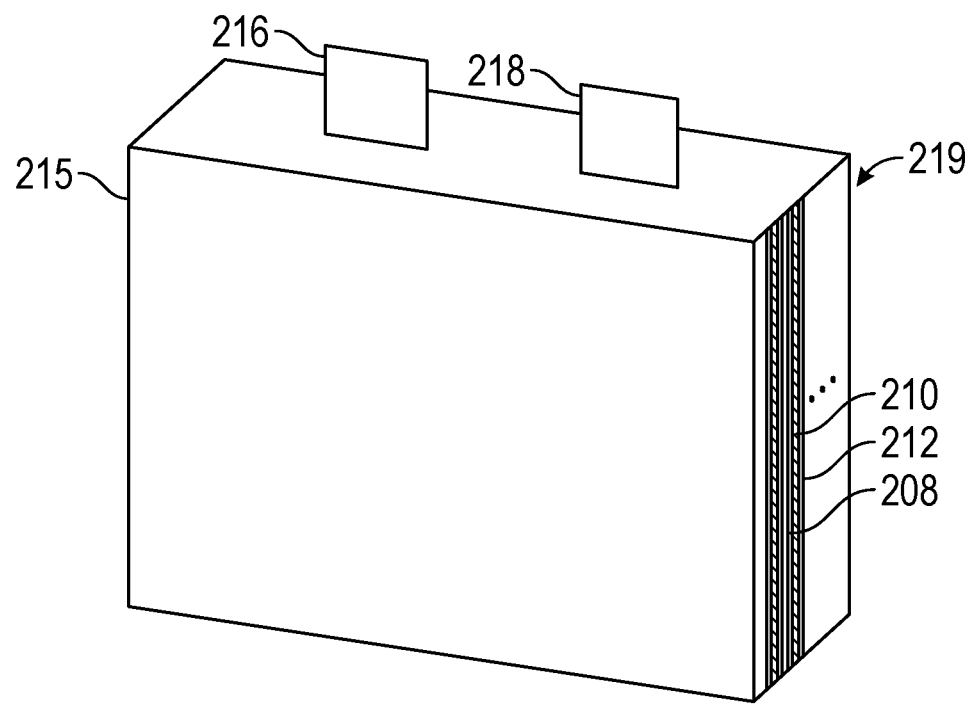
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 215 that forms a flexible or malleable pouch housing. In the implementation of FIG. 2F, the cell housing 215 has a relatively thin cross-sectional width 219. For example, the cell housing 215 in the implementation of FIG. 2F may be formed from a flexible or malleable material (e.g., a foil, such as a metal foil, or film, such as an aluminum-coated plastic film). For example, the cross-sectional width 219 of the cell housing 215 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 215 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 215 of the battery cell 120 can be disposed in the battery module 115, the battery pack 110, or installed in any of the vehicle 100, the building 180, or any other electrically powered component or device.

Figure 3:
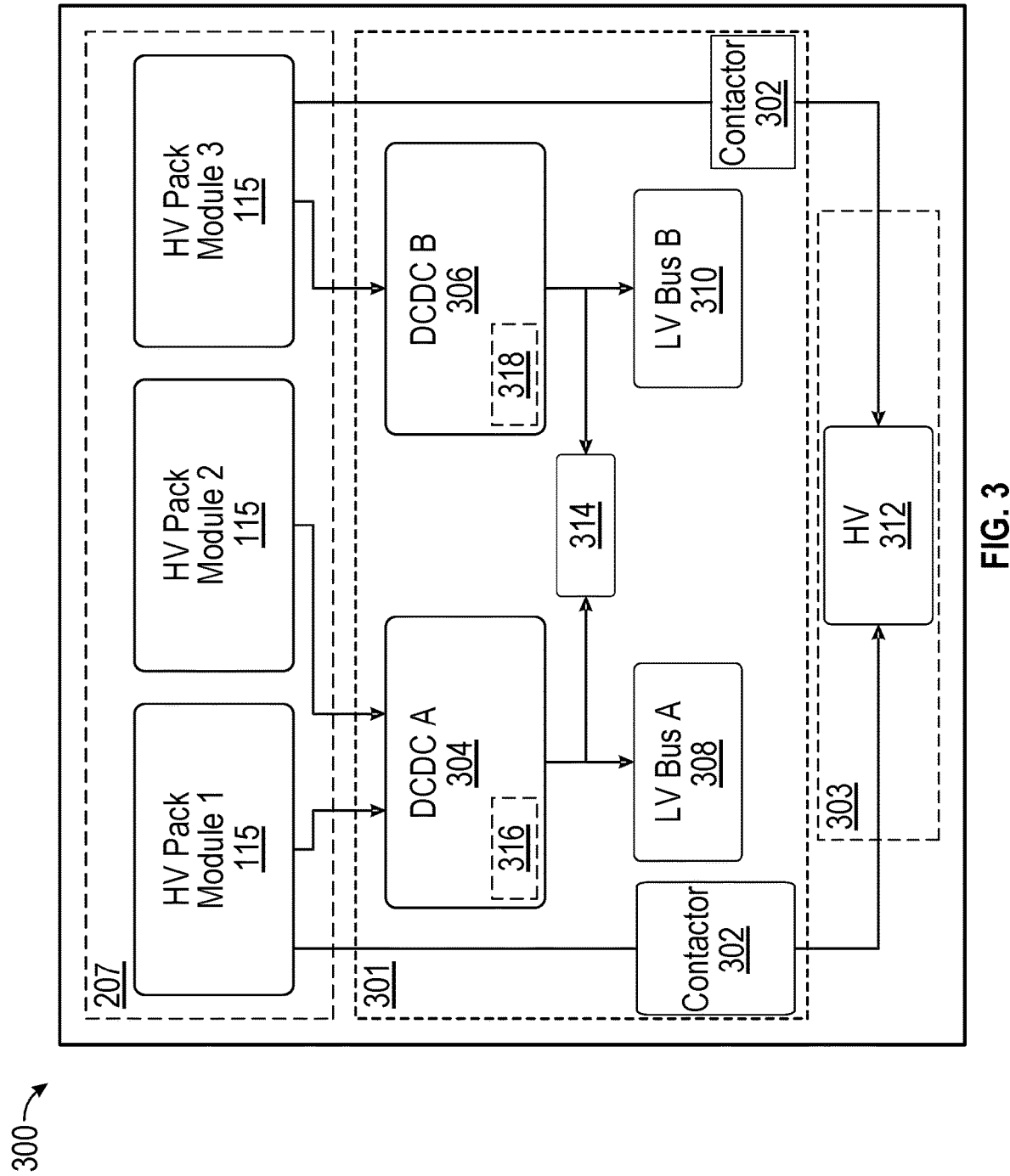
FIG. 3 illustrates a schematic diagram of a low-voltage battery-less architecture in accordance with one or more implementations.

FIG. 3 illustrates a schematic diagram of an electrical architecture that may include a battery pack as described herein. As shown in FIG. 3, an electrical architecture 300 (e.g., an electrical architecture of a vehicle 100 or a building 180) may include the energy volume 207 having one or more battery modules 115 (and/or other subassemblies or groups of battery cells 120). The electrical architecture 300 may also include an electrical architecture 301 of the modular electronic component assembly 273. For example, the electrical architecture 301 may be housed or enclosed in the modular enclosure 290. For example, as discussed in further detail hereinafter, the modular electronic component assembly 273 may include one or more high voltage pass throughs that couple the battery modules 115 (and/or other subassemblies or groups of battery cells 120) in the energy volume 207 to the electrical architecture 301 of the modular electronic component assembly 273.

The battery modules 115 (and/or other subassemblies or groups of battery cells 120) in the energy volume 207 may be electrically coupled, via one or more contactors 302 in the electrical architecture 301 of the modular enclosure 290, to one or more high voltage loads 312 (or load terminals). For example, the high voltage loads 312 may be located in a system 303 that is external to the battery pack 110, and may be connectable to a high voltage supply from the battery modules 115 (and/or other subassemblies or groups of battery cells 120) by connecting a cable or harness having a connector to the electrical contact 203 of FIG. 2A (and/or to one or more other high voltage output connectors on the battery pack 110). As examples, the high voltage load 312 may include the drive component 160 and/or the drive component 162 of FIG. 1A or 1B (e.g., one or more electric motors of a vehicle) or the power stage circuit 172 of FIG. 1C. The contactors 302 may be operable to disconnect the high voltage loads 312 from the battery modules 115 (and/or other subassemblies or groups of battery cells 120) in the energy volume 207.

As shown, the electrical architecture 301 of the modular electronic component assembly 273 may include electrical components that are coupled (e.g., via one or more additional high voltage pass throughs of the modular electronic component assembly 273) to the battery modules 115 (and/or other subassemblies or groups of battery cells 120) pre-contactor (e.g., without a contactor 302 interposed between the electrical components and the battery modules 115 and/or other subassemblies or groups of battery cells 120). In this way, these electrical components of the electrical architecture 301 of the modular electronic component assembly 273 can receive unswitched power from the energy volume 207, which will remain available even if the contactors 302 disconnect power from the energy volume 207 to the high voltage loads 312. As shown, the electrical architecture 301 may include one or more direct-current-to-direct-current (DCDC) converters that directly (e.g., pre-contactor) receive a high voltage from the battery modules 115 (and/or other subassemblies or groups of battery cells 120) of the energy volume 207.

Each of the DCDC converters 304 and 306 may receive the high voltage from the energy volume 207, and convert the high voltage to a relatively lower voltage (e.g., a voltage between twelve and fifteen volts, or between forty and sixty volts). As shown, the electrical architecture 301 may include a low-voltage (LV) bus 308 and a low-voltage bus 310. The low-voltage bus 308 may, for example, receive a low voltage output from the DCDC converter 304 and route the low voltage output to one or more low-voltage connectors, such as a low-voltage connector 291. The low-voltage bus 310 may, for example, receive a low voltage output from the DCDC converter 306 and route the low voltage output to one or more additional low-voltage connectors, such as another low-voltage connector 291.

In the example of FIG. 3, the electrical architecture 301 includes a DCDC converter 304 that receives a voltage (e.g., a high voltage) from first and second ones of the battery modules 115, and a DCDC converter 306 that receives the voltage from a third one of the battery modules 115. This arrangement is merely illustrative, and in other implementations, two battery modules may be coupled to the DCDC converter 306 and one battery module may be coupled to the DCDC converter 304, one battery module may be coupled to each of the DCDC converter 304 and the DCDC converter 306, two battery modules may be coupled to each of the DCDC converter 304 and the DCDC converter 306, or more than two battery modules can be coupled to each of the DCDC converter 304 and the DCDC converter 306. It is also appreciated that the electrical architecture 301 may include more than two DCDC converters in some implementations.

In one or more implementations (e.g., including the implementation illustrated in FIG. 3), the DCDC converter 304 and the DCDC converter 306 may be coupled to distinct sets of one or more of the battery modules 115 (or other distinct groups of battery cells 120) in the energy volume 207. By providing two DCDC converters with two corresponding low-voltage busses and coupled to two distinct sets of battery modules and/or cells, redundant sources of low-voltage power can be provided by the battery pack 110, without the use (or presence) of a separate low-voltage battery. This can be beneficial, for example, for maintaining operation of safety-related features of a vehicle, such as external lights (e.g., headlamps, flashers, turn indicators, CHMSL, brake lamps, reverse lamps), communications components, airbags, power steering, power braking, etc., even in the event of a malfunction or failure of one or more battery cells, battery modules, or circuitry in a DCDC converter of a low voltage bus. For example, one or more of the electronic components of the vehicle may be configured to redundantly receive low voltage power from the low-voltage bus 308 and the low-voltage bus 310.

As shown in FIG. 3, in one or more implementations, the electrical architecture 301 may include a switching mechanism 314. The switching mechanism 314 may be implemented as an isolation switch (e.g., an isoswitch) or other switch that can switchably connect the DCDC converter 304 to the low-voltage bus 308 or the low-voltage bus 310, and/or switchably connect the DCDC converter 306 to the low-voltage bus 308 or the low-voltage bus 310. In implementations in which the DCDC converter 304 and the DCDC converter 306 are coupled to distinct sets of battery cells 120 and/or battery modules 115 within the energy volume 207, providing the switching mechanism 314 facilitates load balancing operations for the battery cells 120 and/or battery modules. For example, switching mechanism 314 can be occasionally and/or situationally operated to maintain similar amounts of charge across the battery cells and/or modules in the energy volume 207. In this way, a vehicle shutdown due to one or more battery cells and/or modules being below a threshold amount of charge can be avoided when one or more other battery cells and/or modules have higher than the threshold amount of charge (e.g., by performing load balancing operations prior to the one or more battery cells and/or modules reaching the threshold amount of charge).

In the example of FIG. 3, load balancing may be performed using a switching mechanism between the low-voltage busses and/or the DCDC converters. However, it is also appreciated that load balancing for the electrical architecture 300 can be performed using other components in other locations (e.g., before the DCDC converters), using symmetric loading across a vehicle, or the like.

In the example of FIG. 3, an electrical architecture 301 is shown for a modular electronic component assembly 273. The electrical architecture 301 may be housed within a modular enclosure 290 configured to mechanically couple to a pack frame 205 of any of various of energy volumes 207 having any of various different types (e.g., different sizes, different voltages, different numbers of battery modules and/or cells, battery cells of different cell chemistries, and/or other different types of energy volume). As shown, the electrical architecture 301 may also include first circuitry (e.g., contactor 302, busbars, terminals, feedthroughs, etc.) within the modular enclosure and configured to provide a first voltage (e.g., a high voltage such as a voltage of hundreds or thousands of volts) from any of the various energy volumes having the various different types to one or more first connectors (e.g., electrical contact 203) of the modular electronic component assembly 273, and second circuitry (e.g., DCDC converter 304, DCDC converter 306, low-voltage bus 308, low-voltage bus 310) within the modular enclosure and configured to receive the first voltage from any of the various energy volumes having the various different types and to provide access to a second voltage (e.g., twelve volts or between twelve and sixteen volts), lower than the first voltage, via one or more second connectors (e.g., low-voltage connector 291) of the modular electronic component assembly 273.

As shown in FIG. 3, the DCDC converter 304 may include additional circuitry 316 (e.g., low voltage I/O circuitry, control circuitry, power circuitry, on-board charger control circuitry) for performing functions other than DCDC conversion. The DCDC converter 306 may include additional circuitry 318 (e.g., low voltage I/O circuitry, control circuitry, power circuitry, terrain control circuitry) for performing functions other than DCDC conversion. For example, the second circuitry of the electrical architecture 301 may include circuitry for operating one or more of the electrical components of a vehicle that are located in a zone (ZR) of the vehicle. For example, the zone may be a rear zone, ZR, of the vehicle. In one or more implementations, the second circuitry may include first control circuitry (e.g., circuitry 316) coupled with the first DCDC converter 304 and configured to operate a first subset of the one or more electrical components, and second control circuitry (e.g., 318) coupled with the second DCDC converter 306 and configured to operate a second subset of the one or more electrical components.

For example, the first subset of the one or more electrical components may include one or more heaters for one or more left rear seats of a vehicle (e.g., vehicle 100), one or more window actuators for one or more left rear windows of the vehicle, one or more seat actuators for the one or more left rear seats of the vehicle, one or more locking mechanisms for one or more left rear doors of a vehicle, one or more door actuators for a rear door or tailgate of the vehicle, one or more trailer brake lamp connectors, one or more trailer brake connectors, one or more trailer power connectors, one or more rear wipers, one or more external rear lights such as a rear license plate lamp or a rear side marker, one or more interior lights (e.g. interior light 153) in the rear zone of the vehicle, one or more power outlets or charger outlets in the left rear of the vehicle, and/or one or more dynamics components, such as a rear oil pump and/or a rear left damper for the vehicle. For example, the second subset of the one or more electrical components may include one or more heaters for one or more right rear seats of a vehicle (e.g., vehicle 100), one or more window actuators for one or more right rear windows of the vehicle, one or more seat actuators for the one or more right rear seats of the vehicle, one or more locking mechanisms for one or more right rear doors of a vehicle, one or more rear radar components, a CHMSL 150, one or more jump ports, one or more actuators for one or more covers (e.g., bed covers, such as a Tonneau cover), one or more actuators for a sunroof or moonroof, one or more rear defroster elements, one or more rear fog lamps, one or more charging port features, an Acoustic Vehicle Alerting System (AVAS), and/or one or more dynamics components such as a wheel speed sensor, a ride height actuator, and/or one or more rear right dampers.

Figure 4:
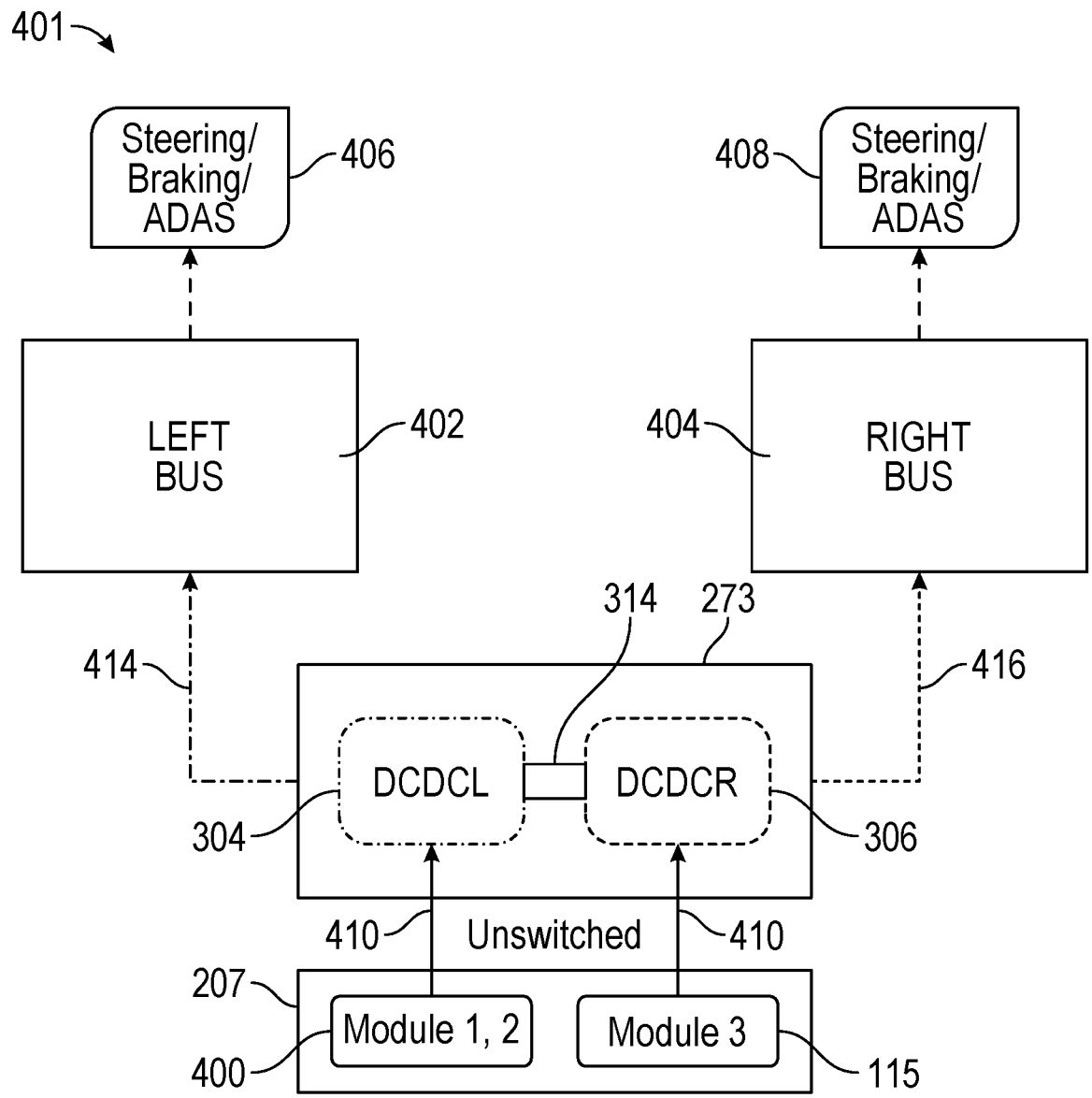
FIG. 4 illustrates a schematic diagram of vehicle electronic components coupled to a low-voltage battery-less architecture in accordance with one or more implementations.

In one or more implementations, the second circuitry (e.g., circuitry 316 or circuitry 318) may be configured to provide the second voltage to one or more zone controllers, external to the battery pack, for operating one or more additional electrical components (e.g., headlamps 157) located in one or more other zones (e.g., the west zone, ZW and/or the east zone, ZE) of the vehicle. For example, FIG. 4 illustrates an example of an electrical architecture 401 that may be implemented in a vehicle. In the example of FIG. 4, controller 402 (e.g., a west zone or left zone controller) is electrically coupled to the DCDC converter 304, and a controller 404 (e.g., an east zone or right zone controller) is electrically coupled to the DCDC converter 306. In this configuration, the DCDC converters 304 and 306 can control the electronic components in the rear zone, ZR, of the vehicle 100 (e.g., as described above), the controller 402 can control (e.g., using low voltage power received from the DCDC converter 304) one or more electronic components in the west zone, ZW, of the vehicle 100, and the controller 404 can control (e.g., using low voltage power received from the DCDC converter 306) one or more electronic components in the east zone, ZE, of the vehicle 100. As discussed herein, the DCDC converter 304 and the DCDC converter 306, coupled respectively to separate distinct battery groups within the energy volume 207, may be arranged to provide redundant low-voltage power to the controller 402, the controller 404, and/or the one or more components (e.g., in the rear zone, ZR) that are controlled directly from the DCDC converter 304 and the DCDC converter 306.

In one or more implementations, high voltage from the energy volume 207 may be provided to the DCDC converter 304 and the DCDC converter 306 via one or more high voltage feed throughs 410. In one or more implementations, the DCDC converter 304 may be coupled (e.g., via the high voltage feed throughs 410) to a set 400 of battery modules 115 (or other battery subassemblies or groups of battery cells) and the DCDC converter 306 may be coupled (e.g., via the high voltage feedthroughs 410) to a single battery module (or other battery subassemblies or groups of battery cells). In one or more implementations, a low voltage output from the DCDC converter 304 may be provided to the controller 402 via a cable 414 (e.g., a cable coupled to a low-voltage connector 291). In one or more implementations, a low voltage output from the DCDC converter 306 may be provided to the controller 402 via a cable 416 (e.g., a cable coupled to another low-voltage connector 291). As illustrated in FIG. 4, the controller 402 may be configured to control electronic components 406 (e.g., steering, braking, ADAS, and/or other electronic components such as windshield wipers, mirror actuators, headlamps, ride height actuators, HVAC controls, charging components, interior lighting, radar components, front fog lamps, universal serial bus (USB) ports, audio components, turn indicators, and/or the like) in the west zone, ZW, of the vehicle 100, and the controller 404 may be configured to control electronic components 408 (e.g., steering, braking, ADAS, and/or other electronic components such as washer pump motors, horn components, rear view mirror controls, frunk lighting, frunk component actuators, accent lighting, sensors, oil pumps, windshield wipers, mirror actuators, headlamps, ride height actuators, HVAC controls, charging components, interior lighting, radar components, front fog lamps, universal serial bus (USB) ports, audio components, turn indicators, and/or the like) in the cast zone, ZE, of the vehicle 100.

Figure 5:
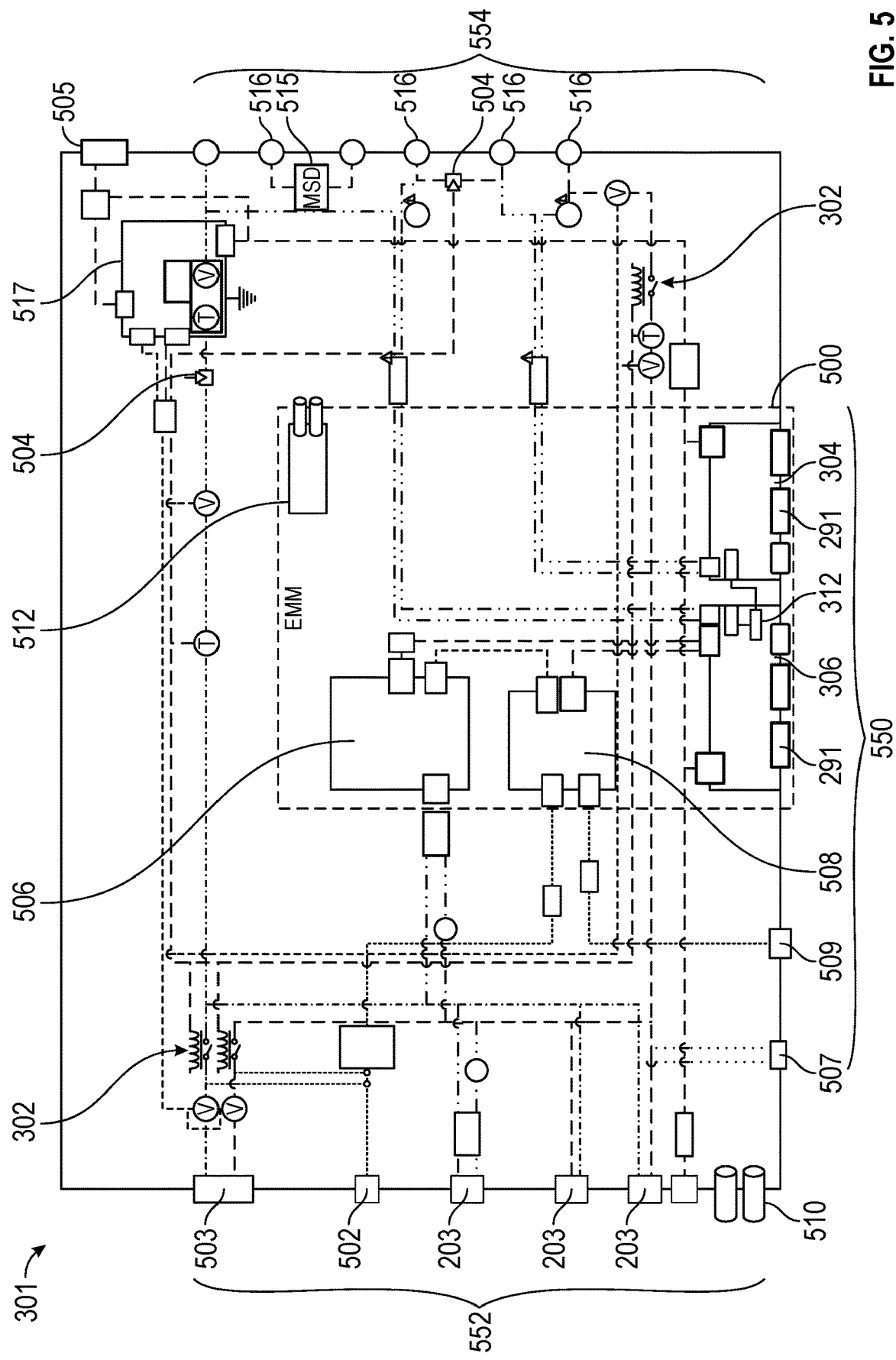
FIG. 5 illustrates a schematic diagram of further details of a low-voltage battery-less architecture in accordance with one or more implementations.

FIG. 5 illustrates additional details of the electrical architecture 301 in accordance with one or more implementations. In this example, the DCDC converter 304 and the DCDC converter 306 are incorporated in an energy management module (EMM) 500. As shown, the energy management module 500 may include additional electrical components and/or circuitry, such as a power board 506 for a bi-directional on-board charger, an alternating current (AC) filter board 508, power electronics, power conversion, and/or other electrical components and/or circuitry. As shown, one or more fluid ports 510 (e.g., an inlet port and an outlet port) may be provided for the electrical architecture 301. In one or more implementations, fluid, such as a cooling fluid (e.g., a coolant) may flow into the modular enclosure 290 via the fluid port(s) 510, and flow into contact with a thermal coupler 512 (e.g., a cold plate) within the EMM 500 (e.g., to provide cooling for the DCDC converter 304, the DCDC converter 306, the power board 506, the alternating current (AC) filter board 508, and/or other electrical components not shown in FIG. 5, such as busbars, cables, or the like).

As shown in FIG. 5 each of the DCDC converter 304 and the DCDC converter 306 may be coupled to one or more terminals 516 that are couplable to the battery modules 115 (and/or other subassemblies or groups of battery cells 120) in the energy volume 207 to receive the high voltage from the energy volume 207. As shown, electrical architecture 301 includes unswitched (e.g., direct, pre-contactor) connections between the DCDC converter 304 and the DCDC converter 306 and the one or more terminals 516. In contrast, one or more electrical contacts 203 (e.g., high voltage terminals, such as a high voltage terminal for each of one or more drive components 160, and/or an Electronic Accelerator Control (EAC) system) may be coupled to the one or more terminals 516 via one or more respective contactors 302 (e.g., contactors that are switchably operable to disconnect the electrical contacts 203 from the high voltage terminals 516. In this way, if the terminal(s) 516 are disconnected from the electrical contacts 203 (e.g., by opening the contactors 302, and/or using a service disconnect 515), the DCDC converter 304 and the DCDC converter 306 (and the downstream electronic components coupled thereto) can continue to receive power from the energy volume via the terminals 516. In this example, the electrical architecture 301 also includes an alternating current (AC) input terminal 502, and a direct current fast charge (DCFC) terminal 503 in a portion 552 of the electrical architecture 301.

In the example of FIG. 5, the electrical architecture 301 includes a first pyrofuse 504 configured to disconnect the DCDC converter 304 and the DCDC converter 306 from a first source of the high voltage (e.g., a first set of one or more battery modules 115 and/or other subassemblies or groups of battery cells 120 coupled to a first set of the terminals 516) without disconnecting the DCDC converter 304 and the DCDC converter 306 from a second source of the high voltage (e.g., a second set of one or more battery modules 115 and/or other subassemblies or groups of battery cells 120 coupled to a second set of the terminals 516). The electrical architecture 301 may also include a second pyrofuse 504 configured to disconnect the DCDC converter 304 and the DCDC converter 306 from the second source of the high voltage without disconnecting the second circuitry from the first source of the high voltage. In this way, the DCDC converter 304 and the DCDC converter 306 can continue to receive power from the energy volume 207, and provide a redundant source of the low voltage, even in the event of a vehicle collision or a fault between the first and second sources.

In the example of FIG. 5, the electrical contacts 203, the AC input terminal 502, the DCFC terminal 503, and the fluid port(s) 510 are formed in a portion 552 of the electrical architecture 301. In this example, the low-voltage connector(s) 291, an AC output terminal 509, and a service test port 507 are formed on a portion 550 of the electrical architecture 301. In this example, the terminals 516 and a low-voltage interface 505 between the electrical architecture 301 and the energy volume 207 are formed in a portion 554 of the electrical architecture 301. As discussed hereinafter, the portion 550, the portion 552, and the portion 554 may be located on or within respective portions of the modular enclosure 290. For example, the portion 550 of the electrical architecture 301 may be located in a "dry" zone of a vehicle 100, the dry zone being interior to a seal between the modular enclosure 290 and a body structure of the vehicle 100 (e.g., and exposed to the internal environment of the vehicle 100). For example, the portion 552 of the electrical architecture 301 may be located in a "wet" zone of a vehicle 100, the wet zone being outside of a seal between the modular enclosure 290 and a body structure of the vehicle 100 (e.g., and exposed to the external environment of the vehicle 100). For example, the portion 554 of the electrical architecture 301 may be located at an interface between the modular enclosure 290 and the pack frame 205 of the energy volume 207.

Figure 6:
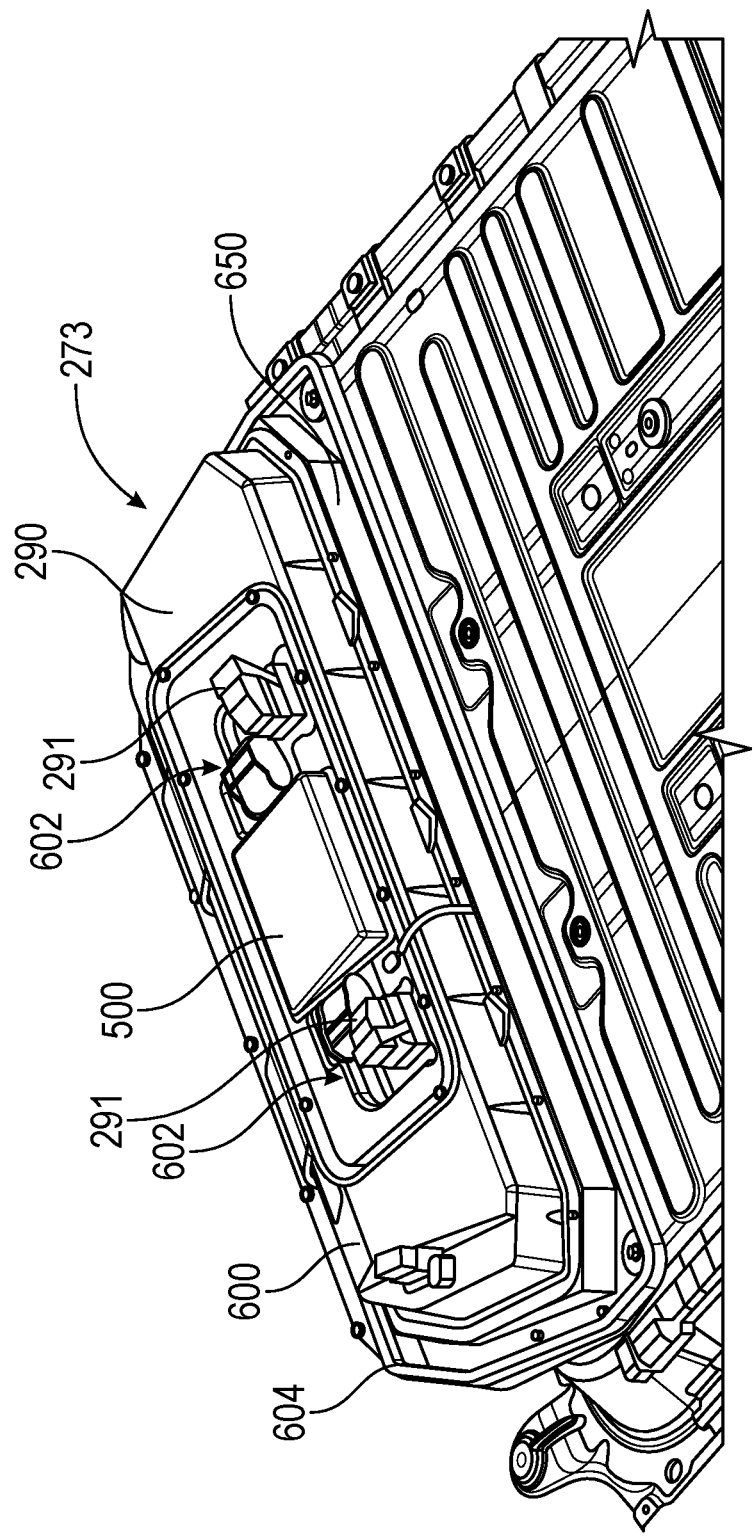
FIG. 6 illustrates a top perspective view of a portion of a battery pack in accordance with one or more implementations.

FIG. 6 shows an exemplary implementation of a portion of the battery pack 110 having the modular electronic component assembly 273 attached to the pack frame 205. As described herein, the modular electronic component assembly 273 may include the modular enclosure 290, and the electrical architecture 301 disposed within the modular enclosure 290. In the example of FIG. 6, the modular enclosure 290 includes an access panel 600 and a solid insulating tub 650. In this example, a portion of the EMM 500 is visible in an opening 602 in the access panel 600. In this example, a pair of low-voltage connectors 291 are visible extending from the EMM 500 through the opening 602.

As shown in FIG. 6, in one or more implementations, the access panel 600 is attached to a solid insulating tub 650. As shown, the solid insulating tub 650 may include a seal 604. The seal 604 may be configured, for example, to interface with a body structure of a vehicle, such as vehicle 100. In this way, the seal 604 may sealingly separate the access panel 600 from a portion (e.g., a wet zone) of the vehicle that can be exposed to environmental conditions (e.g., from an underside of the vehicle). In this way, the access panel 600, and the low-voltage connectors 291 (e.g., in the portion 550 of the electrical architecture 301) may be located in a "dry" zone of the vehicle 100. In one or more implementations, the seal 604 may be configured to provide tolerances for multiple mountings (e.g., enclosure 290 to pack frame 205, enclosure 290 to the vehicle body), vibration loading, etc., The seal 604 may be implemented as a lip seal, a radial seal, or other sealing mechanism or feature.

The access panel 600 may be removed (e.g., by detaching the access panel 600 from the solid insulating tub 650) to provide access (e.g., for servicing) one or more other electrical components of the electrical architecture 301. The access panel 600 may be removed from the enclosure 290 without detaching the solid insulating tub 650 from the pack frame 205.

Figure 7:
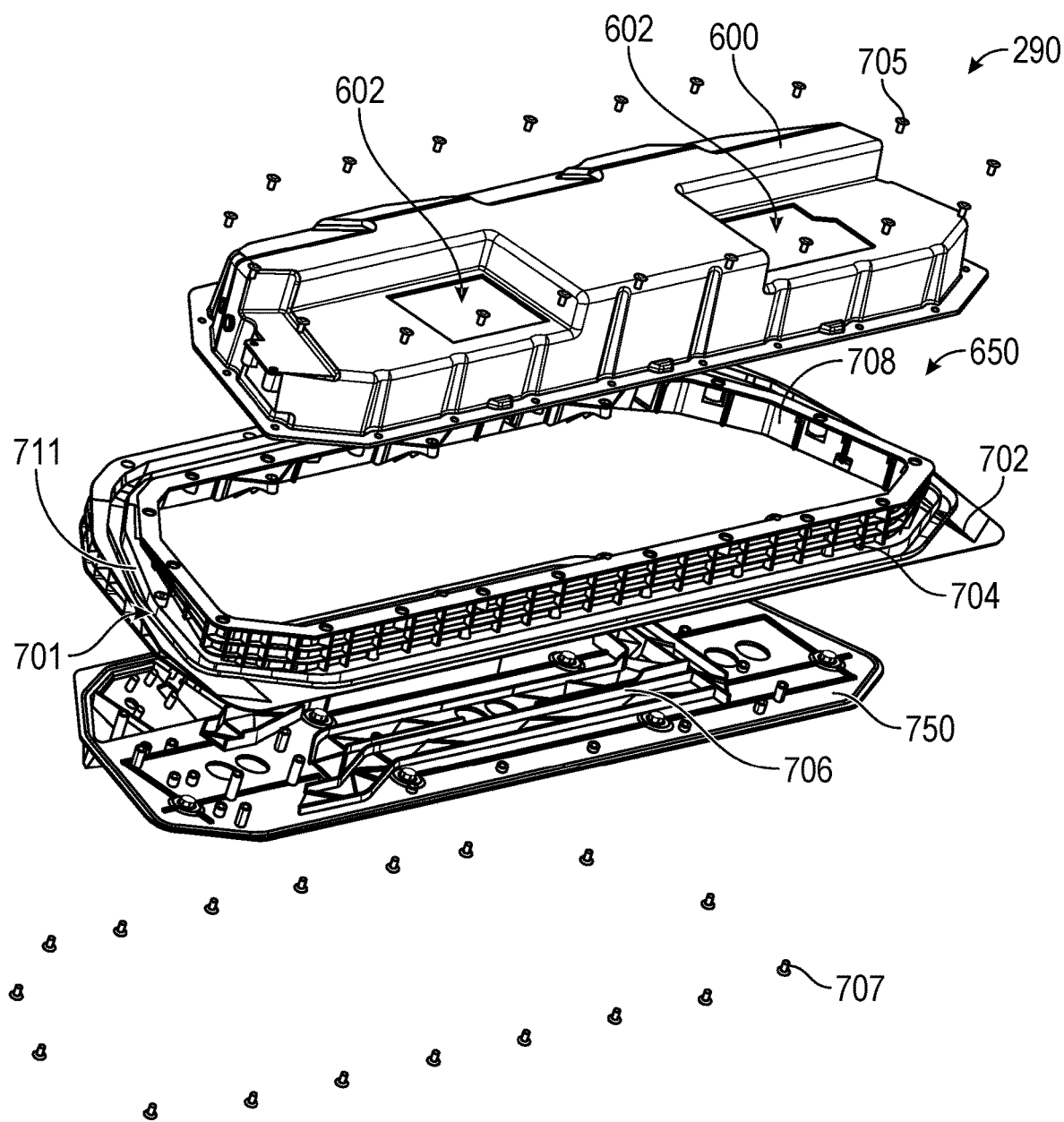
FIG. 7 illustrates an exploded perspective view of a modular enclosure for a low voltage battery-less architecture in accordance with one or more implementations.

FIG. 7 illustrates an exploded perspective view of the modular enclosure 290, in accordance with one or more implementations. As shown in FIG. 7, the access panel 600 may be provided with one or more openings 602 (e.g., for providing access to one or more low-voltage connectors 291 or other connections to the electrical architecture 301). As shown, the solid insulating tub 650 may form a peripheral wall 701 for the enclosure 290. The solid insulating tub 650 may include a solid insulating structure 702 that may be provided with a conductive layer 708 on a surface thereof. In the example of FIG. 7, the conductive layer 708 is formed on an interior surface of the solid insulating structures 702. However, in one or more other implementations, the conductive layer 708 may be formed on an exterior surface of the solid insulating tub.

In various implementations, the conductive layer 708 may be formed from a foil (e.g., a metal foil, such as an aluminum foil, compressed onto the surface), a coating (e.g., a metal coating, such as a coating formed using a vapor deposition process), or a resin (e.g., an EMI compliant resin). In one or more implementations, the access panel 600 may also be formed from a solid insulating structure having the conductive layer 708 on a surface (e.g., an interior surface) thereof. By forming the access panel and/or the solid insulating tub 650 from an insulating material with a conductive layer 708 (or from a lighter metal, such as magnesium), the mass of the enclosure 290 can be reduced (e.g., relative to providing a full metal enclosure, such as a steel or aluminum enclosure, or relative to increasing the side of the pack frame 205 to enclose the electrical components), while meeting EMI and EMC specifications. This reduced mass can increase the range of an electric vehicle in which the battery pack 110 is implemented. The solid insulating tub 650 may include one or more ribs 704 (e.g., on the peripheral wall 701). The ribs 704 may be configured to provide structural rigidity to the solid insulating tub. In this way, the enclosure 290 may be provided with a structural rigidity, and can be integrated as a structural component of a vehicle, such as the vehicle 100, in one or more implementations. A groove 711 may be provided on a surface (e.g., a top surface) of the peripheral wall 701 of the solid insulating tub 650. For example, the groove 711 may be configured to receive (e.g., to be filled with) a sealing material for forming the seal 604 of FIG. 6.

As shown in FIG. 7, the enclosure 290 may also include a tray 750. The tray 750 may be configured for mounting one or more of the electrical components of the electrical architecture 301 thereto, and the tray 750 and the access panel 600 may be configured to at least partially enclose the electrical architecture 301. As shown, the solid insulating tub 650 may be disposed between the tray 750 and the access panel 600. For example, the access panel 600 and the tray 750 may be attached to the solid insulating tub 650 (e.g., to opposing sides, such as top and bottom sides, of the solid insulating tub 650). In one or more implementations, the tray 750 may include one or more features 706 (e.g., molded features, such as channels, sub-walls, brackets, etc.). For example, the features 706 may be configured for retaining, supporting, securing, or mounting one or more of the electrical components (e.g., including cables, busbars, etc.) of the electrical architecture 301. In the example of FIG. 7, the tray 750 is a molded structure (e.g., an insulating structure, such as a molded plastic structure), and the features 706 are integral molded features of the molded structure.

As illustrated in FIG. 7, the access panel 600 may be attached to the solid insulating tub 650, such as by fasteners 705 (e.g., bolts, screws, or other fasteners) around the periphery of the access panel 600. The tray 750 may be attached to the solid insulating tub 650, such as by fasteners 707 (e.g., bolts, screws, or other fasteners) around the periphery of the tray 750. Providing a separate solid insulating tub 650 between the tray 750 and the access panel 600 may facilitate installation of the electrical architecture 301 into the enclosure 290 (e.g., by providing additional space and flexibility for installing some of the electrical components of the electrical architecture 301 on the tray 750 prior to attaching the solid insulating tub 650 to the tray 750).

Figure 8:
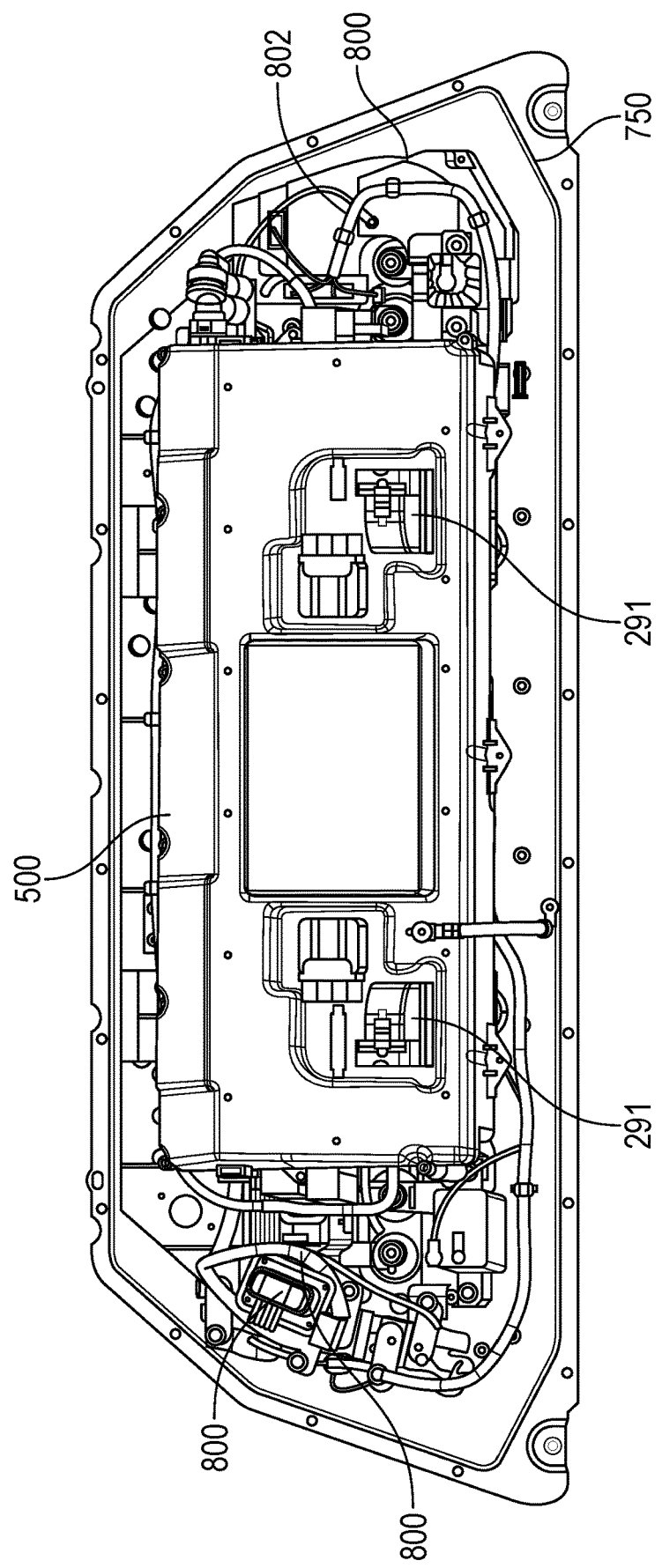
FIG. 8 illustrates a top perspective view of the modular enclosure of FIG. 6 with an access panel removed in accordance with one or more implementations.
Figure 9:
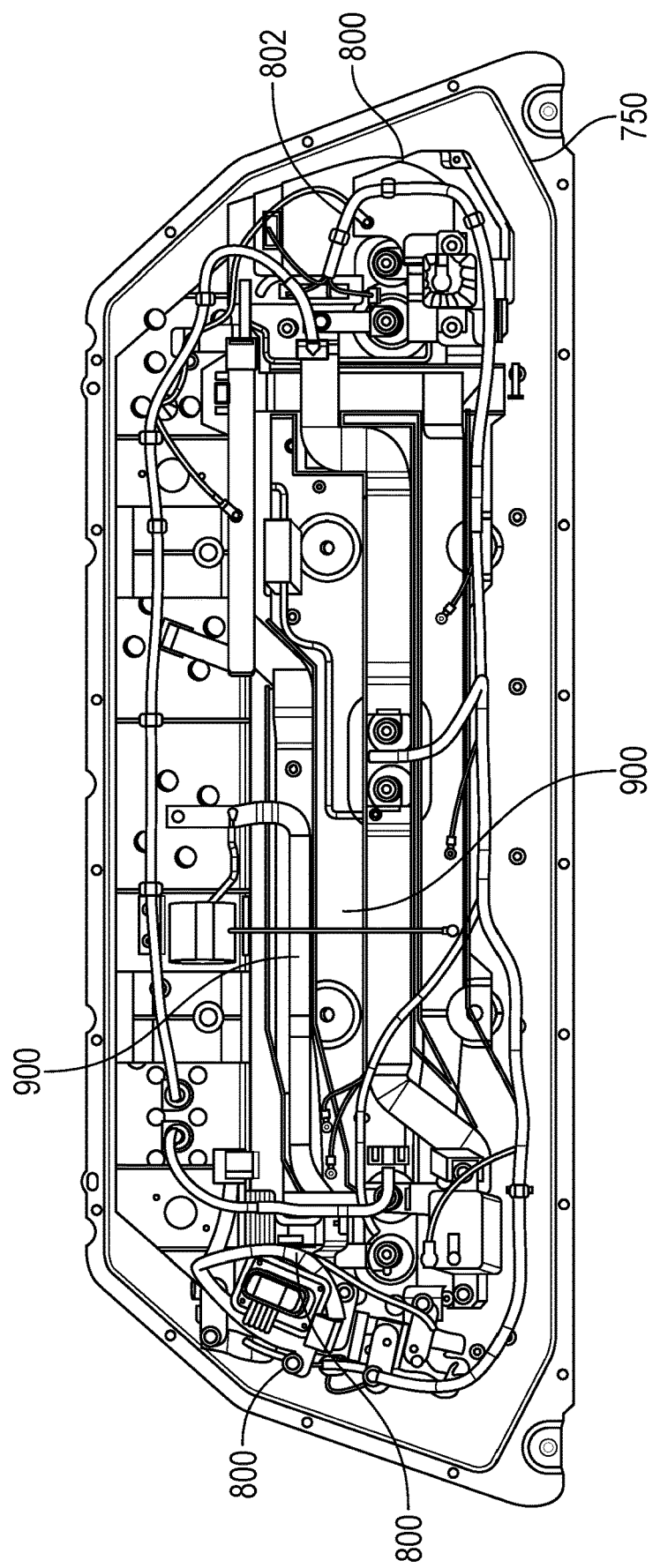
FIG. 9 illustrates a top perspective view of the modular enclosure of FIG. 8 with an energy management module (EMM) removed in accordance with one or more implementations.

FIG. 8 illustrates a top perspective view of the modular electronic component assembly 273 with the access panel 600 and the solid insulating tub 650 of the modular enclosure 290 removed. In this view, the EEM 500, additional electronic components 800 of the electrical architecture 301, and one or more thermal components 802 (e.g., fluid lines) within the modular electronic component assembly 273 can be seen. FIG. 9 illustrates a top perspective view of the modular electronic component assembly 273 of FIG. 8 with EMM 500 removed. In this view, additional electrical components (e.g., busbars 900) of the electrical architecture 301 can be see, mounted to the features 706 of the tray 750.

Figure 10:
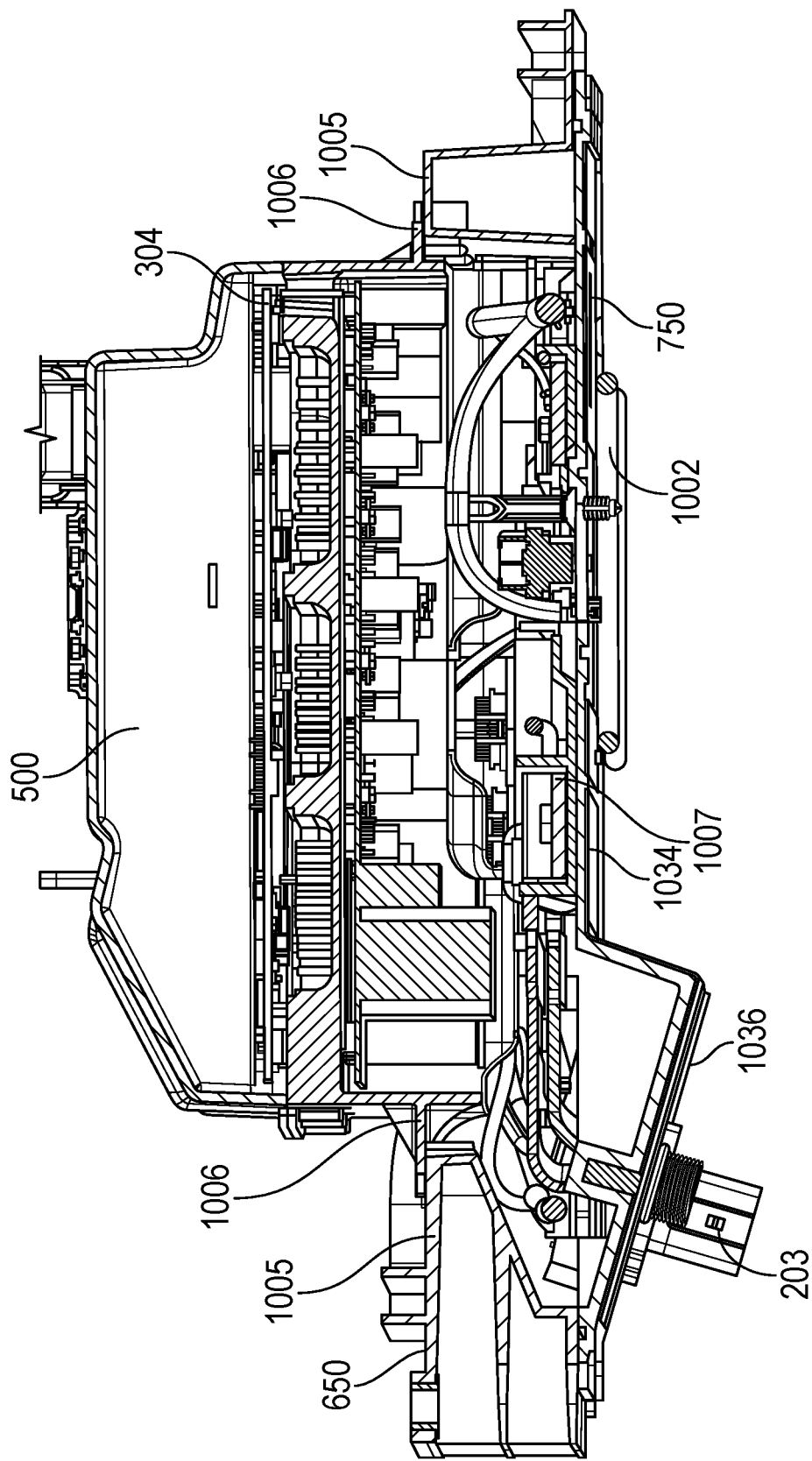
FIG. 10 illustrates a cross-sectional side view of a modular electronic component assembly in accordance with one or more implementations.

FIG. 10 illustrates a cross-sectional side view of the modular electronic component assembly 273, with the electrical architecture 301 installed therein and the access panel 600 removed. As shown, the solid insulating tub 650 may include a ledge 1005. The ledge 1005 may be configured for mounting a flange 1006 of the EMM 500. By mounting the EMM 500 to the ledge 1005, a gap 1007 may be provided between the EMM 500 and the tray 750. One or more additional electrical components 800 (e.g., including cables, wire harnesses, busbars 900, a high voltage distribution bus (HVDB), etc.) and/or one or more thermal features (e.g., cold plates, fluid lines such as thermal components 802, etc.) may be mounted within the gap 1007 (e.g., mounted to the mounting features 706 on the tray 750). FIG. 10 also shows how the enclosure 290 may include one or more sealing features 1002 configured to provide a seal around the high-voltage feedthroughs (e.g., terminals 516) to the energy volume 207. FIG. 10 also illustrates how a portion 1036 of the tray 750 may have a shape that is configured to overhang an edge of the pack frame 205, and how the electrical contact 203 (e.g., a high-voltage output connector) may be provided on the portion 1036. The portion 1036 may correspond to a location of the portion 552 of the electrical architecture 301. Another portion 1034 of the bottom surface of the tray 750 may be configured to mount in contact with an outer surface of the pack frame 205. The portion 1034 may correspond to a location of the portion 554 of the electrical architecture 301. The portion 550 of the electrical architecture 301 may be located at the top of the modular enclosure 290, such as within the openings 602.

Figure 11:
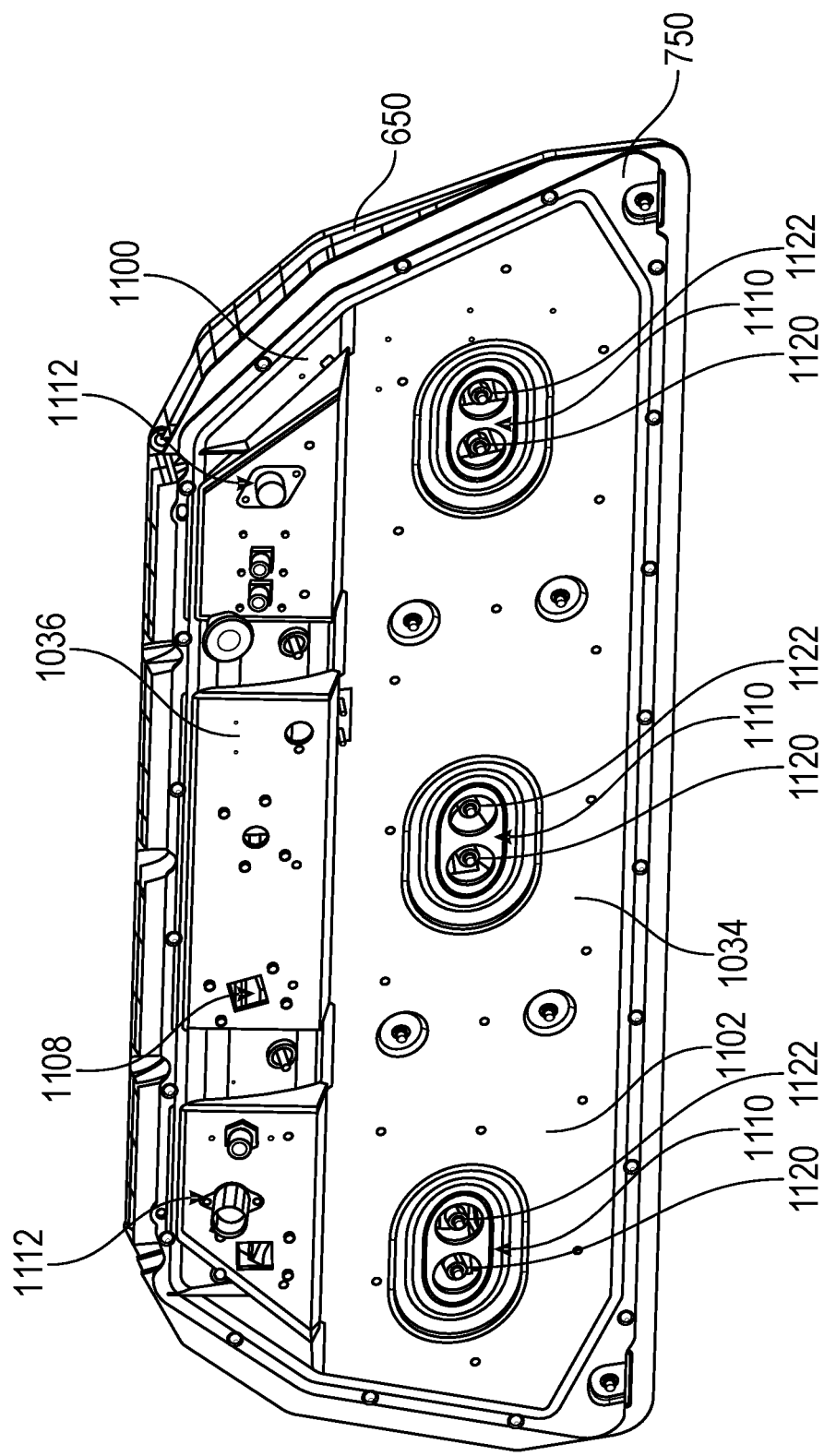
FIG. 11 illustrates a bottom perspective view of a modular electronic component assembly in accordance with one or more implementations.

FIG. 11 illustrates a bottom perspective view of the enclosure 290 in accordance with one or more implementations. In the example of FIG. 11, a bottom surface of the tray 750 can be seen. As shown, the tray 750 may be formed from a solid insulating tray 1100 that is overmolded onto a grounding structure 1102. For example, the grounding structure 1102 may include a metal layer over which a moldable material (e.g., plastic) is overmolded to form the solid insulating tray 1100 with the metal layer molded thereto.

In one or more implementations, the tray 750 may include an outer surface (e.g., the bottom surface that is visible in FIG. 11) having a first portion 1034 that is configured to interface with a frame (e.g., pack frame 205) of the energy volume 207 of the battery pack 110, and a second portion 1036 that is configured to overhang the frame of the energy volume 207 of the battery pack. As shown, the tray 750 may include one or more first openings 1110 in the first portion 1034 of the outer surface. For example, the first openings 1110 may be configured for accommodating one or more high voltage and/or low voltage feedthroughs between the enclosure 290 and the energy volume 207. For example, as shown in FIG. 11, one or more high voltage terminals, such as a high voltage terminal 1120 (e.g., a negative high voltage terminal, such as one of terminals 516) and a high voltage terminal 1122 (e.g., a positive high voltage terminal, such as another of terminals 516) may be provided in each of the openings 1110 to couple one or more high voltage sources within the energy volume 207 to one or more of the electrical components (e.g., EMM 500 and/or electrical components 800) within the enclosure 290. Although not visible in FIG. 11, one or more low-voltage connectors (e.g., 505) may also be provided for feedthrough between the energy volume 207 and the enclosure 290 (as described in further detail hereinafter). The tray 750 may include one or more second openings 1108 in the second portion 1036 of the outer surface. The second openings 1108 may be configured for accommodating one or more high voltage output connectors (e.g., electrical contact 203) coupled to the one or more electrical components of the electrical architecture 301. The tray 750 may also include one or more third openings 1112 in the second portion 1036. The one or more third openings 1112 may be configured to accommodate one or more coolant ports (e.g., fluid ports 510) for the enclosure 290.

Figure 12:
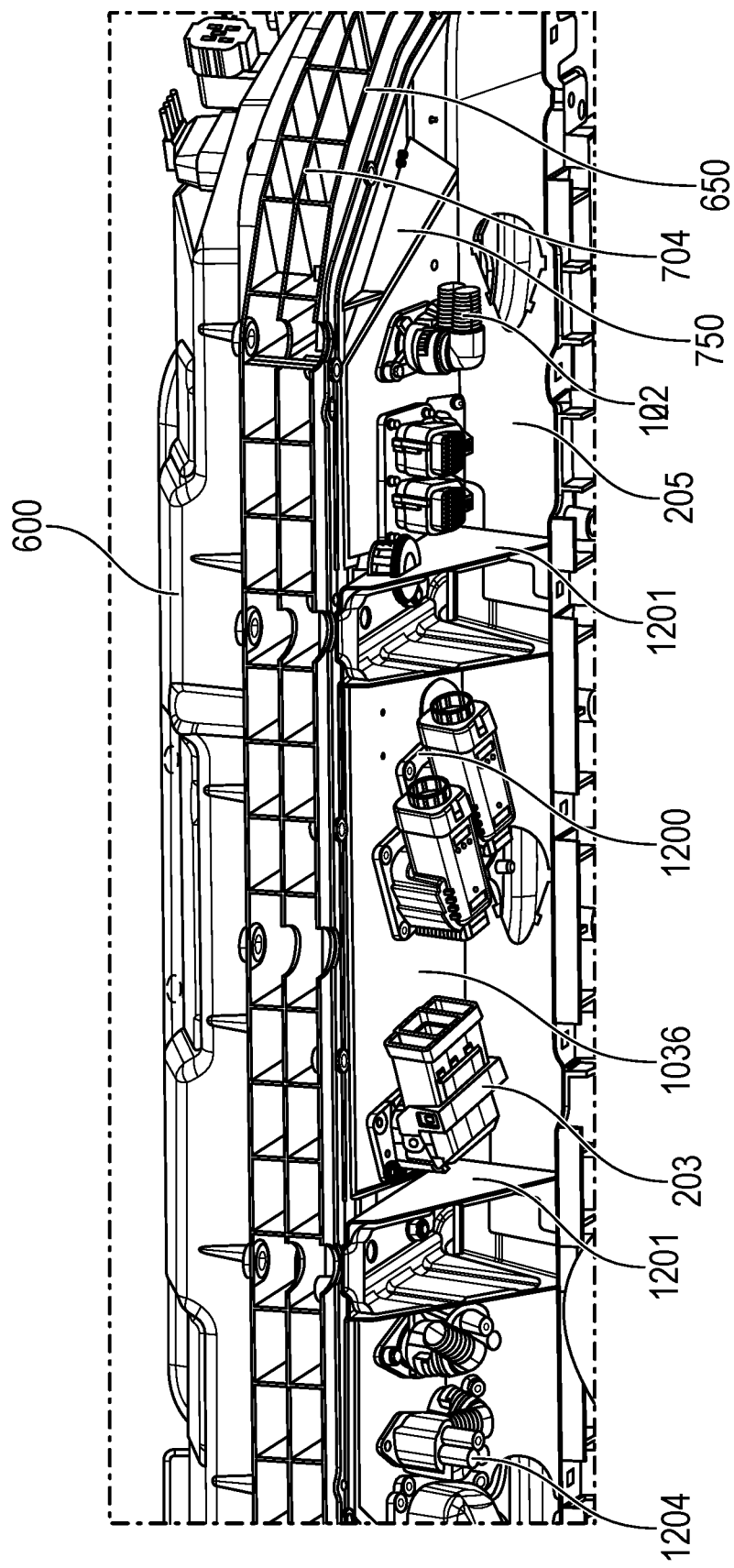
FIG. 12 illustrates a bottom perspective view of a portion of a battery pack having a modular enclosure with one or more connectors to electrical components with the modular enclosure in accordance with one or more implementations.

FIG. 12 illustrates a bottom perspective view of a portion of the battery pack 110 of FIG. 6, showing the second portion 1036 of the tray 750 with various connectors attached thereto. For example, the electrical contact 203 and/or one or more other high-voltage connectors 1200 (e.g., for providing a high voltage output, such as a voltage of hundreds of volts from the battery cells 120 within the energy volume 207) and/or low-voltage connectors 1204 (e.g., for providing one or more low voltages, such as a voltage of between twelve and sixteen volts and/or between forty five and sixty volts from the battery cells 120 within the energy volume 207) can be provided on the second portion 1036 of the tray 750 that overhangs the edge of the pack frame 205. As shown, one or more fluid ports, such as a fluid port 1202 (e.g., an implementation of the fluid port 510 of FIG. 5), may also be provided on the second portion 1036 of the tray 750 that overhangs the edge of the pack frame 205. The fluid port 1202 and/or one or more other fluid ports on the portion 1036 of the tray 750 may provide coolant inlet ports and/or coolant outlet ports for a cooling fluid to pass into and out of the enclosure 290 to cool one or more of the electrical components (e.g., the EMM 500) disposed therein. FIG. 12 also shows how one or more support structures 1201 can be provided to support the overhanging portion of the enclosure 290 on the pack frame 205, and to strengthen the overall structure of the battery pack 110 and/or the vehicle 100.

In one or more implementations, the electrical contact(s) 203, the high-voltage connector(s) 1200, the low-voltage connector(s) 1204, the fluid port(s) 1202, the support structure(s) 1201, and the second portion 1036 of the tray may be disposed in a "wet zone" of the vehicle 100 (e.g., corresponding to the portion 552 of the electrical architecture 301). For example, the wet zone may be located outside of the seal 604 shown in FIG. 6.

Figure 13:
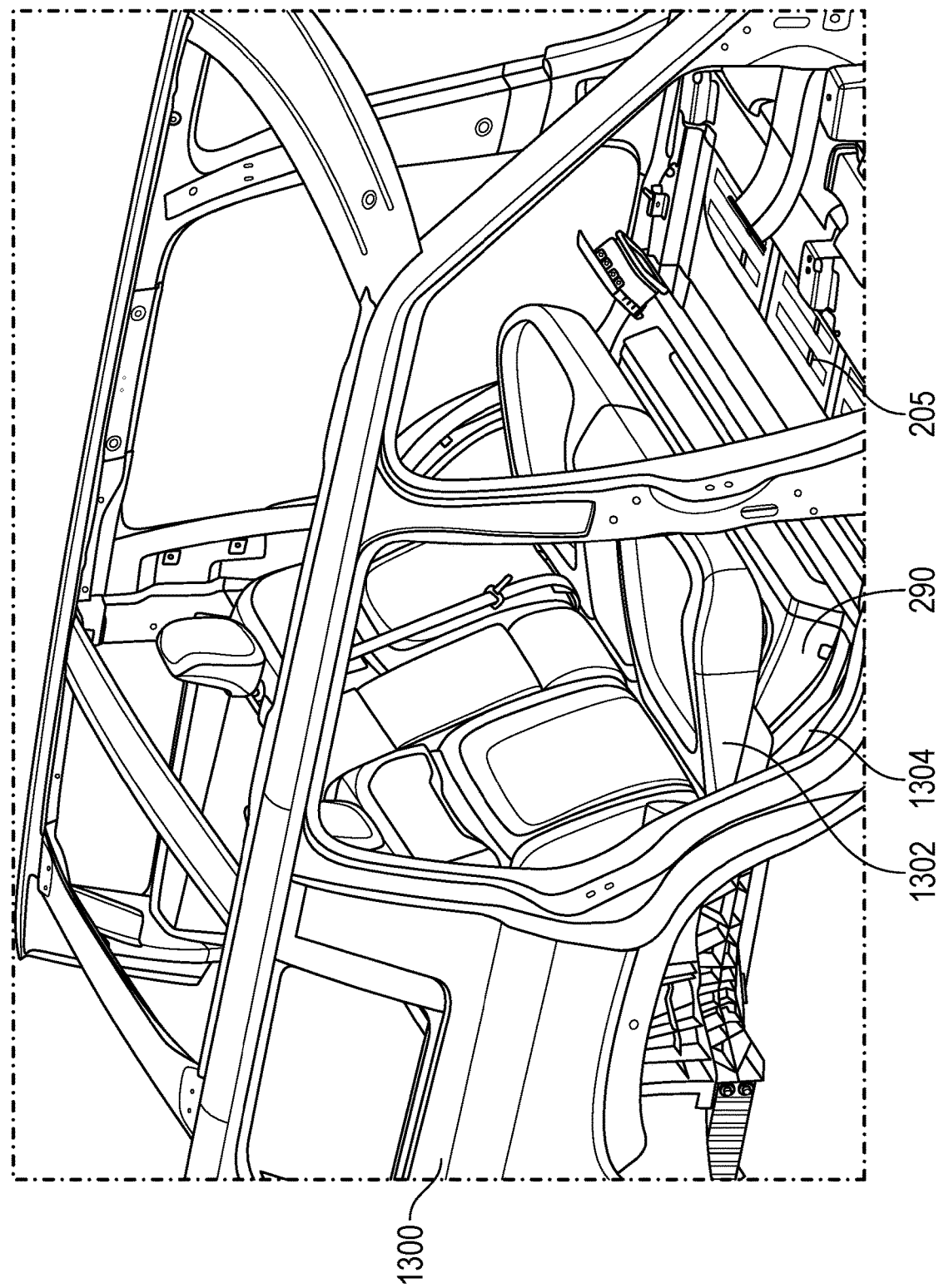
FIG. 13 illustrates a perspective view of a portion of a vehicle having a low voltage battery-less architecture in accordance with one or more implementations.

FIG. 13 illustrates an example implementation in which the battery pack 110 having the modular enclosure 290 is implemented in a body 1300 of a vehicle, such as the vehicle 100. As shown, in one or more implementations, the enclosure 290 may be mounted under a rear seat 1302 of the vehicle 100 (e.g., in the rear zone, ZR). For example, the rear seat 1302, or a portion thereof (e.g., the seat cushion of the rear seat 1302) may be removable or displaceable to allow access to the low-voltage connector(s) 291 of the EMM 500. The enclosure 290 may seal to a body structure 1304 of the vehicle, such as by compressing the seal 604 between the enclosure 290 and the body structure 1304.

Figure 14:
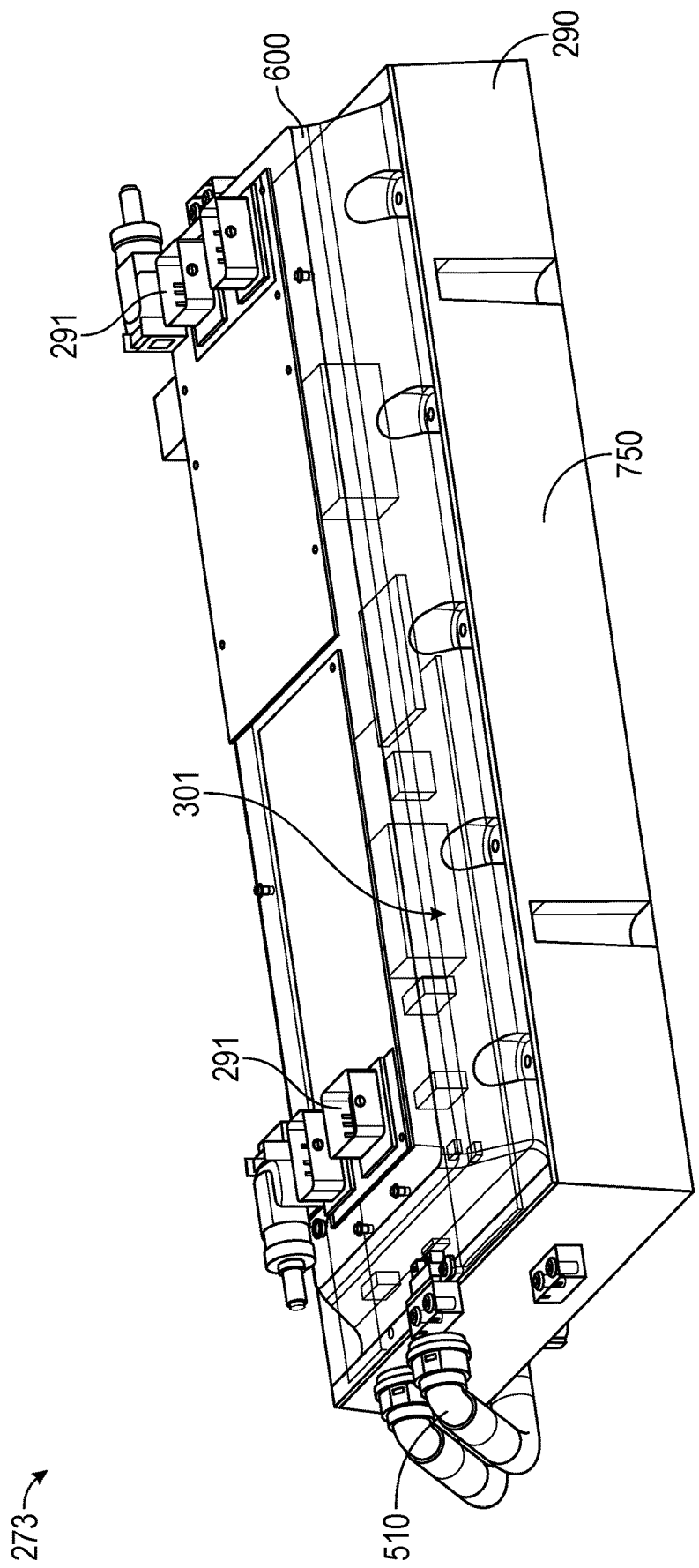
FIG. 14 illustrates another implementation of a modular enclosure for a low voltage battery-less architecture in accordance with one or more implementations.

The example arrangement of the modular enclosure 290 that is described in connection with FIGS. 6-13 is merely illustrative, and other implementations of the modular enclosure 290 are contemplated herein. For example, FIG. 14 illustrates another arrangement of the modular enclosure 290 enclosing the electrical architecture 301. In the example of FIG. 14, the access panel 600 is attached directly to the tray 750. In this example, the low-voltage connectors 291 are provided on the top surface of the access panel 600.

As illustrated by FIGS. 1A-14, in one or more implementations, a battery pack 110 for a vehicle 100 may be provided, the battery pack including one or more batteries (e.g., one or more battery modules 115, and/or one or more battery cells 120 and/or other groups or subassemblies thereof) configured to provide a first voltage (e.g., a high voltage, such as hundreds of volts). The battery pack 110 may also include first circuitry (e.g., EMM 500, electrical components 800, electrical contact 203, and/or high voltage connectors 1200) configured to provide access to the first voltage from the one or more batteries by a drive component (e.g., a drive unit, such as drive component 160 and/or drive component 162) of the vehicle. The battery pack 110 may also include second circuitry (e.g., DCDC converter 304, DCDC converter 306, LV bus 308, LV bus 310, and/or low-voltage connectors 291) configured to receive the first voltage from the one or more batteries and to provide (e.g., redundant) access to a second voltage (e.g., a voltage between twelve and sixteen volts, or between forty and sixty volts), lower than the first voltage, by one or more electrical components (e.g., a CHMSL 150, a brake actuator 151, an interior light 153, a turn indicator 155, a headlamp 157, a wiper, an audio amplifier, a fog lamp, a radar component, a mirror actuator, an HVAC component, a seat heater, a seat ventilator, a charging port, a brake lamp, a trailer connector, a door actuator, a window actuator, a ride height actuator, a defroster, a seat actuator, one or more sensors, an oil pump, etc.) of the vehicle.

For example, the first circuitry may include a high voltage connector (e.g., contact 203) and a contactor 302 disposed between the one or more batteries and the high voltage connector. For example, the second circuitry may include first and second direct-current-to-direct-current (DCDC) converters (e.g., DCDC converter 304 and DCDC converter 306) and first and second low voltage buses (e.g., LV bus 308 and LV bus 310) electrically coupled to first and second DCDC converters, respectively.

In one or more implementations, the one or more batteries may include a first battery module 115 (or other first battery subassembly or other group of battery cells) and a second battery module 115 (or other second battery subassembly or other group of battery cells). The first DCDC converter (e.g., DCDC converter 304) may be configured to receive the first voltage from the first battery module 115 and to be electrically isolated from the second battery module 115. The second DCDC converter (e.g., DCDC converter 306) may be configured to receive the first voltage from the second battery module 115 and to be electrically isolated from the first battery module 115. In one or more implementations, the one or more batteries may also include a third battery module 115 (or other third battery subassembly or other group of battery cells). The first DCDC converter may be configured to receive the first voltage from the first battery module 115 and the third battery module 115, and the second DCDC converter may be electrically isolated from the first battery module 115 and the third battery module 115.

In one or more implementations, the battery pack 110 may also include a switching mechanism 314 configured to switchably connect the first low voltage bus between the first and second DCDC converters and to switchably connect the second low voltage bus between the first and second DCDC converters, such as for load balancing of at least the first battery module 115 and the second battery module 115. For example, load balancing of at least the first battery module 115 and the second battery module 115 may include periodically or situationally connecting the first low voltage bus to the second battery module 115 via the second DCDC converter, such as when the first battery module 115 has a remaining charge percentage that is significantly less than (e.g., more than five percent less than or more than ten percent less than) the remaining charge percentage of the second battery module 115. As another example, load balancing of at least the first battery module 115 and the second battery module 115 may include periodically or situationally connecting the second low voltage bus to the first battery module 115 via the first DCDC converter, such as when the second battery module 115 has a remaining charge percentage that is significantly less than (e.g., more than five percent less than or more than ten percent less than) the remaining charge percentage of the first battery module 115.

In one or more implementations, the one or more batteries may be disposed within a frame (e.g., pack frame 205) of an energy volume (e.g., energy volume 207) of a battery pack 110, and the first circuitry and the second circuitry may be disposed within a modular enclosure 290 attached to the frame of the energy volume. The second circuitry may include at least one low voltage port 291 that is accessible from a top of the modular enclosure 290 and configured for direct connection to an electrical harness of the vehicle. As described herein, the battery pack 110 may be implemented in the vehicle 100, and the vehicle may be free of (e.g., may not include) a low voltage battery (e.g., a separate twelve volt battery) separate from the one or more batteries of the battery pack.

As illustrated by FIGS. 1A-14, in one or more implementations, a modular electronic component assembly 273 may include first circuitry that includes at least one contactor 302 configured to disconnect the first voltage from one or more first connectors (e.g., electrical contact 203 and/or high voltage connector(s) 1200), and one or more second connectors that may be accessible via an opening 602 in an access panel 600 of the enclosure 290. The one or more first connectors may be provided on a bottom panel (e.g., tray 750) of the enclosure 290 and may be configured to be sealingly separated from the one or more second connectors by a seal 604 between the enclosure and a body structure 1304 of a vehicle 100. In one or more implementations, the modular electronic component assembly 273 may also include, within the enclosure 290, one or more of an energy management module (EMM) 500, a battery management system (BMS) 517, and a high voltage distribution bus (HVDB, such as an HVDB included in the electrical components 800).

FIG. 15 illustrates a flow diagram of an example process 1500 that may be performed for operating a vehicle, in accordance with implementations of the subject technology. For explanatory purposes, the process 1500 is primarily described herein with reference to the vehicle 100, the enclosure 290, and the electrical architecture 301 of FIGS. 1A-14. However, the process 1500 is not limited to the vehicle 100, the enclosure 290, and the electrical architecture 301 of FIGS. 1A-14, and one or more blocks (or operations) of the process 1500 may be performed by or with one or more other structural components of other devices, systems, or moveable apparatuses. Further for explanatory purposes, some of the blocks of the process 1500 are described herein as occurring in serial, or linearly. However, multiple blocks of the process 1500 may occur in parallel. In addition, the blocks of the process 1500 need not be performed in the order shown and/or one or more blocks of the process 1500 need not be performed and/or can be replaced by other operations.

As illustrated in FIG. 15, at block 1502, a first voltage (e.g., a high voltage, such as a voltage of hundreds of volts) may be provided from a battery (e.g., battery pack 110, battery module(s) 115, battery cells 120, and/or one or more subassemblies and/or groups thereof) of a vehicle (e.g., vehicle 100) to a propulsion component (e.g., a drive unit, such as drive component 160) of the vehicle. The first voltage may also be provided to one or more additional propulsion components (e.g., a drive unit, such as drive component 162) of the vehicle.

At block 1504, while providing the first voltage from the battery to the propulsion component, a second voltage, lower than the first voltage, may be provided from the battery to an electronic component (e.g., a CHMSL 150, a brake actuator 151, an interior light 153, a turn indicator 155, a headlamp 157, a wiper, an audio amplifier, a fog lamp, a radar component, a mirror actuator, an HVAC component, a seat heater, a seat ventilator, a charging port, a brake lamp, a trailer connector, a door actuator, a window actuator, a ride height actuator, a defroster, a seat actuator, one or more sensors, an oil pump, etc.) of the vehicle.

In one or more implementations, the process 1500 may also include disconnecting the battery from the propulsion component (e.g., using one or more contactors 302 and/or a main service disconnect 515), and continuing to provide, while the propulsion component of the vehicle is disconnected from the battery, the second voltage from the battery to the electronic component.

Aspects of the subject technology can help improve the reliability and/or range of electric vehicles. This can help facilitate the functioning of and/or proliferation of electric vehicles, which can positively impact the climate by reducing greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A battery pack for a vehicle, the battery pack comprising:
   one or more batteries configured to provide a first voltage, the one or more batteries comprising a first battery subassembly and a second battery subassembly;
   first circuitry configured to provide access to the first voltage from the one or more batteries by a drive component of the vehicle; and
   second circuitry configured to receive the first voltage from the one or more batteries and to provide access to a second voltage, lower than the first voltage, by one or more electrical components of the vehicle, the second circuitry comprising a first direct-current-to-direct-current (DCDC) converter and a second DCDC converter, wherein:
      the first DCDC converter is configured to receive the first voltage from the first battery subassembly and is electrically isolated from the second battery subassembly, and
      the second DCDC converter is configured to receive the first voltage from the second battery subassembly and is electrically isolated from the first battery subassembly.

2. The battery pack of claim 1, wherein the first circuitry comprises a high voltage connector and a contactor disposed between the one or more batteries and the high voltage connector, and wherein the second circuitry is configured to provide redundant access to the second voltage by the one or more electrical components of the vehicle.

3. The battery pack of claim 2, wherein the second circuitry comprises the first and second direct-current-to-direct-current (DCDC) converters and first and second low voltage buses electrically coupled to first and second DCDC converters, respectively.

4. The battery pack of claim 3, wherein the one or more batteries further comprise at least a third battery subassembly, wherein the first DCDC converter is configured to receive the first voltage from the first battery subassembly and at least the third battery subassembly, and wherein the second DCDC converter is electrically isolated from the first battery subassembly and the third battery subassembly.

5. The battery pack of claim 3, further comprising a switching mechanism configured to switchably connect the first low voltage bus between the first and second DCDC converters and to switchably connect the second low voltage bus between the first and second DCDC converters, for load balancing of at least the first battery subassembly and the second battery subassembly.

6. The battery pack of claim 3, wherein the second circuitry further comprises control circuitry for operating one or more of the electrical components that are located in a zone of the vehicle.

7. The battery pack of claim 6, wherein the zone comprises a rear zone of the vehicle, and wherein the second circuitry is further configured to provide the second voltage to one or more zone controllers, external to the battery pack, for operating one or more additional electrical components located in one or more other zones of the vehicle.

8. The battery pack of claim 6, wherein control circuitry comprises:
   first control circuitry coupled with the first DCDC converter and configured to operate a first subset of the one or more electrical components; and
   second control circuitry coupled with the second DCDC converter and configured to operate a second subset of the one or more electrical components.

9. The battery pack of claim 1, wherein the one or more batteries are disposed within a frame of an energy volume of a battery pack, and wherein the first circuitry and the second circuitry are disposed within a modular enclosure attached to the frame of the energy volume.

10. The battery pack of claim 9, wherein the second circuitry comprises at least one low voltage port that is accessible from a top of the modular enclosure and configured for direct connection to an electrical harness of the vehicle.

11. The battery pack of claim 1, wherein the battery pack is implemented in the vehicle, and wherein the vehicle is free of a low voltage battery separate from the one or more batteries of the battery pack.

12. The battery pack of claim 1, wherein the one or more electrical components are pre-contactor electrically coupled with the one or more batteries and configured to receive unswitched power from the one or more batteries based on the pre-contactor electrical coupling.

13. A modular electronic component assembly, comprising:
   an enclosure configured to mechanically couple to a frame of any of a plurality of energy volumes having a plurality of different types, the enclosure comprising:
      an access panel having an opening; and
      a bottom panel coupled with the access panel;
   a seal coupled with the enclosure;
   first circuitry within the enclosure and configured to provide a first voltage from any of the plurality of energy volumes having the plurality of different types to one or more first connectors of the modular electronic component assembly; and
   second circuitry within the enclosure and configured to receive the first voltage from any of the plurality of energy volumes having the plurality of different types and to provide access to a second voltage, lower than the first voltage, via one or more second connectors of the modular electronic component assembly, wherein:
      the one or more first connectors are provided on the bottom panel are configured to be sealingly separated from the one or more second connectors based on the seal being positioned between the enclosure and a body structure of a vehicle, and
      the one or more second connectors are accessible via an opening in an access panel of the enclosure.

14. The modular electronic component assembly of claim 13, wherein the first circuitry comprises at least one contactor configured to disconnect the first voltage from the one or more first connectors.

15. The modular electronic component assembly of claim 13, further comprising, within the enclosure, one or more of an energy management module (EMM), a battery management system (BMS), and a high voltage distribution bus (HVDB).

16. The modular electronic component assembly of claim 13, wherein the second circuitry is configured to electrically couple to at least first and second sources of the first voltage in any of the plurality of energy volumes and configured to provide redundant access to the second voltage via the one or more second connectors of the modular electronic component assembly, and wherein the modular electronic component assembly further comprises:
   a first pyrofuse configured to disconnect the second circuitry from the first source of the first voltage without disconnecting the second circuitry from the second source of the first voltage; and a second pyrofuse configured to disconnect the second circuitry from the second source of the first voltage without disconnecting the second circuitry from the first source of the first voltage.

17. A method, comprising:

providing a first voltage from a battery comprising a first battery subassembly and a second battery subassembly of a vehicle to a propulsion component of the vehicle;

receiving the first voltage at a first direct-current-to-direct-current (DCDC) converter from the first battery subassembly, wherein the first DCDC converter is electrically isolated from the second battery subassembly;

receiving the first voltage at a second DCDC converter from the second battery subassembly, wherein the second DCDC converter is electrically isolated from the first battery subassembly; and providing, while providing the first voltage from the battery to the propulsion component, a second voltage, lower than the first voltage, from the at least one of the first DCDC converter or the second DCDC converter to an electronic component of the vehicle.

18. The method of claim 17, further comprising:

disconnecting the battery from the propulsion component; and continuing to provide, while the propulsion component of the vehicle is disconnected from the battery, the second voltage from the battery to the electronic component.

19. The method of claim 17, further comprising electrically coupling, by a switching mechanism, the first DCDC converter with the second DCDC converter.

* * * * *